(12) United States Patent
Storey et al.

(10) Patent No.: US 11,087,262 B2
(45) Date of Patent: Aug. 10, 2021

(54) SYSTEMS AND METHODS FOR GENERATING CUSTOMER SOLUTIONS

(71) Applicant: Level 3 Communications, LLC, Broomfield, CO (US)

(72) Inventors: Jeff Storey, Boulder, CO (US); Yunas Nadiadi, Superior, CO (US); Rene Grippo, Boulder, CO (US); Allen E. Dixon, Arvada, CO (US); Eric D. Gundersen, Broomfield, CO (US); Luke P. Philips, Denver, CO (US); Rajiv K. Singh, Thornton, CO (US); Sanjiv Kumar, Erie, CO (US); Eric D. Prosser, Broomfield, CO (US); Derek Hodovance, Littleton, CO (US); Wesley Jensen, Broomfield, CO (US); Imran A. Aslam, Thornton, CO (US); Maria A. Elliott, Broomfield, CO (US); Peter Cleary, Pembroke, MA (US); Andrew Dugan, Superior, CO (US); Paul Farnsworth, Niwot, CO (US); John F. Waters, Jr., Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1444 days.

(21) Appl. No.: 14/335,626

(22) Filed: Jul. 18, 2014

(65) Prior Publication Data
US 2015/0025940 A1    Jan. 22, 2015

Related U.S. Application Data

(63) Continuation of application No. 14/335,523, filed on Jul. 18, 2014.
(Continued)

(51) Int. Cl.
*G06Q 10/06* (2012.01)
*G06Q 10/00* (2012.01)
*G06Q 30/06* (2012.01)

(52) U.S. Cl.
CPC ......... *G06Q 10/0639* (2013.01); *G06Q 10/00* (2013.01); *G06Q 30/06* (2013.01); *G06Q 10/063* (2013.01)

(58) Field of Classification Search
CPC ............ G06Q 10/101; G06Q 20/0281; G06Q 10/0639; G06Q 10/10; G06Q 10/00; G06Q 30/06; G06Q 10/063
See application file for complete search history.

(56) References Cited

U.S. PATENT DOCUMENTS

| 6,059,842 A * | 5/2000 | Dumarot | G06F 9/44505 706/47 |
| 6,584,414 B1 * | 6/2003 | Green | G01N 33/42 701/408 |

(Continued)

FOREIGN PATENT DOCUMENTS

WO    WO-2010084479 A2 *    7/2010    ............ G06F 9/5011

OTHER PUBLICATIONS

How to keep your network in tip-top health; using anyone of the six net management suites in this review will help diagnose and cure network ills. (May 16, 2013). Network World, , NA. Retrieved from https://dialog.proquest.com/professional/docview/1348771069?accountid=131444 (Year: 2013).*

(Continued)

*Primary Examiner* — Gerardo Araque, Jr.

(57) ABSTRACT

Implementations described and claimed herein provide systems and methods for generating customer solutions using real-time information for new customer sales and/or current customer support. In one implementation, technical infrastructure information for an installed network design pro- (Continued)

viding one or more telecommunication products at one or more customer sites is retrieved. Customer service analytics are generated based on the technical infrastructure information and output for display on a graphical user interface.

24 Claims, 24 Drawing Sheets

Related U.S. Application Data

(60) Provisional application No. 61/847,946, filed on Jul. 18, 2013, provisional application No. 61/856,504, filed on Jul. 19, 2013.

(56) References Cited

U.S. PATENT DOCUMENTS

| | | | |
|---|---|---|---|
| 6,601,233 B1* | 7/2003 | Underwood | G06F 8/24 717/100 |
| 7,623,548 B2* | 11/2009 | Gilmartin | H04L 12/2602 370/468 |
| 8,463,929 B2 | 6/2013 | Hiie et al. | |
| 2003/0074463 A1* | 4/2003 | Swartz | H04L 29/06 709/230 |
| 2003/0099202 A1* | 5/2003 | Lear | H04L 65/601 370/238 |
| 2003/0172145 A1* | 9/2003 | Nguyen | G06Q 10/10 709/223 |
| 2003/0174648 A1 | 9/2003 | Wang et al. | |
| 2004/0044544 A1 | 3/2004 | Smith et al. | |
| 2008/0037553 A1* | 2/2008 | Gilmartin | H04L 12/2602 370/395.41 |
| 2009/0016236 A1 | 1/2009 | Alcala | |
| 2009/0113244 A1* | 4/2009 | Doshi | H04W 24/08 714/25 |
| 2011/0211686 A1 | 9/2011 | Wall et al. | |
| 2011/0243553 A1* | 10/2011 | Russell | G06Q 30/0631 398/25 |
| 2012/0069131 A1 | 3/2012 | Abelow | |
| 2012/0117422 A1 | 5/2012 | Radhakrishnan | |
| 2013/0179790 A1 | 7/2013 | Nadiadi et al. | |
| 2014/0112192 A1* | 4/2014 | Chou | H04L 45/16 370/254 |
| 2014/0280901 A1* | 9/2014 | Balachandran | H04W 24/04 709/224 |

OTHER PUBLICATIONS

Extended European Search Report, dated Dec. 22, 2016, Application No. 14826852.7, filed Jul. 18, 2014; 7 pgs.
International Search Report, dated Nov. 12, 2014, Int'l Appl. No. PCT/US14/047286, Int'l Filing Date Jul. 18, 2014; 3 pgs.
Written Opinion of the International Searching Authority, dated Nov. 12, 2014, Int'l Appl. No. PCT/US14/047286, Int'l Filing Date Jul. 18, 2014; 8 pgs.
Allen, Lynn, "Using AutoCAD's powerful tool palettes to your fullest advantage, Part 2", http://www.cadalyst.com/cad/autocad/using-autocad039s-powerful-tool-palettes-your-fullest-advantage-part-2-2900, Cadalyst Dec. 15, 2004, 5 pgs.

\* cited by examiner

SYSTEMS AND METHODS FOR GENERATING CUSTOMER SOLUTIONS

CROSS-REFERENCE TO RELATED APPLICATIONS

The present application is a continuation of U.S. patent application Ser. No. 14/335,523, entitled "Systems and Methods for Generating Customer Solutions" and filed on Jul. 18, 2014. The present application also claims benefit under 35 U.S.C § 119 to U.S. Provisional Patent Application No. 61/847,946, entitled "Sales Engineer Toolbox" and filed on Jul. 18, 2013, and to U.S. Provisional Patent Application No. 61/856,504, entitled "Sales Engineer Toolbox" and filed on Jul. 19, 2013. Each of these applications are incorporated by reference in their entirety herein.

TECHNICAL FIELD

Aspects of the present disclosure relate to design, configuration, performance management, provisioning, and quoting services, among other features and advantages, and in particular to generating customer solutions using real-time information for new customer sales and/or current customer support.

BACKGROUND

Industries providing products involving a complex technical infrastructure, such as the telecommunications industry, are faced with unique challenges in meeting customer expectations during the sales and delivery process and in maintaining customer satisfaction after an order is completed. Such industries generally involve multiple layers of provisioning and design to fulfill an order, often with parallel workflows ongoing and various responsible parties. Sales engineers, for example, fill a variety of roles that bridge the gap between conventional salespeople and engineers with daily tasks varying. Generally, sales engineers interface with the customer during both the pre-sales phase to generate a design and quote for the customer and the post-sales phase to analyze customer inventory and usage and to troubleshoot. The challenges in fulfilling the myriad responsibilities of a sales engineer are further exacerbated by a lack of an accurate consolidated inventory and an information disconnect between the numerous tools conventionally used by sales engineers. For example, providing a telecommunications solution for a new customer might involve open systems interconnection (OSI) layer 1, layer 2, and layer 3 inventory, with several different tools used to access details about each. Similarly, numerous disparate tools may be necessary to obtain a complete understanding of a customer's existing telecommunications network. The diversity of tools and associated data integrity issues may lead to a random discovery phase, thereby decreasing efficiency and increasing costs. Further, many conventional tools fail to leverage current information about a telecommunication provider's network assets and product capabilities to ensure proposed solutions can be provisioned as designed and can meet the customer's requirements.

It is with these observations in mind, among others, that various aspects of the present disclosure were conceived and developed.

SUMMARY

Implementations described and claimed herein address the foregoing problems, among others, by providing systems and for generating customer solutions using real-time information for new customer sales and/or current customer support. In one implementation, technical infrastructure data for a provider network is retrieved from one or more databases. The technical infrastructure data represents network assets and capabilities. Location information is obtained for at least one customer site. A product selection including a set of design attributes for one or more telecommunication products is received. A network access point for providing the one or more telecommunication products is determined based on a correlation of the technical infrastructure data with the location information. A configuration for the at least one customer site is generated based on the product selection. A design is generated based on the network access point and the at least one configured customer site.

In another implementation, one or more customer sites are identified, and a selection of one or more telecommunication products is received. A design for providing the one or more telecommunication products at the one or more customer sites is generated. An expected performance of the one or more telecommunication products is determined.

In still another implementation, technical infrastructure information for an installed network design providing one or more telecommunication products at one or more customer sites is retrieved. Customer service analytics are generated based on the technical infrastructure information and output for display on a graphical user interface.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for generating customer solutions using real-time information for new customer sales and/or current customer support. Generally, a portal generates a customer solution for a new or existing customer and provides the solution to the customer for review and approval. In generating the customer solution, the portal analyzes the viability of a design for telecommunication services provided to the customer by a telecommunication provider and configures the design accordingly. As such, the portal reduces rework by ensuring that the customer solution may be provisioned as designed and fully meets the customer's needs, thereby improving customer satisfaction and consistency across various personnel. For example, the portal may analyze the estimated performance of a proposed design (e.g., latency, resiliency, etc.) and the impact of any modifications to the design on performance. The portal provides the customer solution in the context of the telecommunication provider's network assets and capabilities integrated with the customer's locations, applications, and needs, which increases the scope and accuracy of proposed customer solutions. The customer solution is output for presentation in substantially real-time as edits are made and in a user-friendly format to facilitate review and approval by the customer. To ensure continued customer satisfaction, customer service analytics are generated, for example, to determine a performance of the products and suggestions for improving performance.

In one aspect, during the quoting process, the customer may use the portal to make modifications, provide additional detail, interact with the telecommunication provider's personnel, and approve the customer solution. Once the customer provides approval, further detail for delivering the customer solution is collected. The portal is configured to interact with various other systems to deliver information for installing the customer solution. As the customer solution is provisioned and installed, the customer may use the portal to make any additional changes and/or provide any missing information. Once the customer solution is installed, the installed design is stored as a new version for comparison of what was initially designed versus what was actually installed.

The various systems and methods disclosed herein generally provide for design, configuration, performance management, provisioning, and quoting services and for generating customer solutions using real-time information for new customer sales and/or current customer support. The example implementations discussed herein reference the telecommunication industry and customer solutions for telecommunication products. However, it will be appreciated by those skilled in the art that the presently disclosed technology is applicable to other industries and products.

Figure 1:
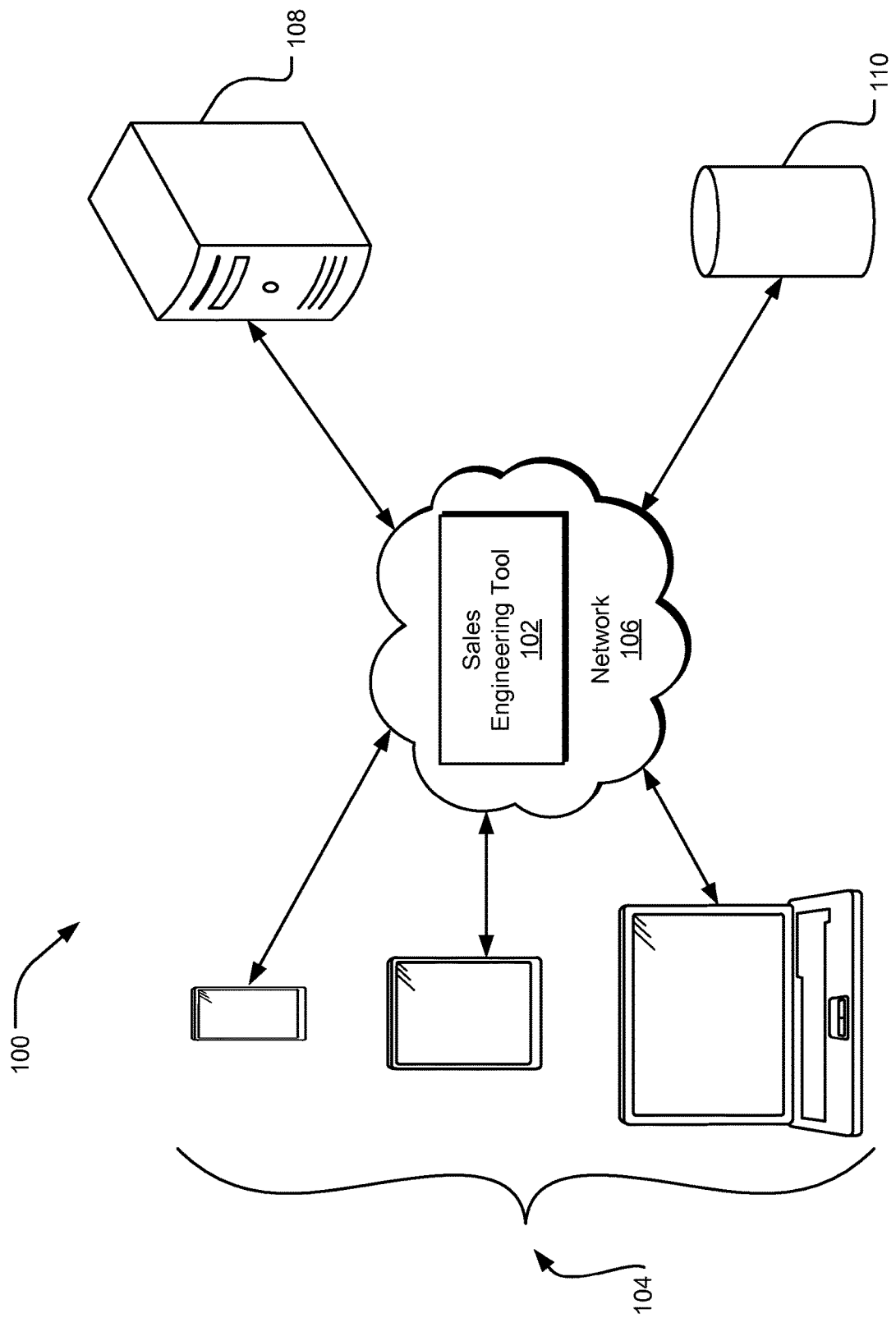
FIG. 1 shows an example network environment, including a sales engineering tool running on at least one server or other computing device coupled with a network, for generating customer solutions using real-time information for new customer sales and/or current customer support.

For a detailed description of an example network environment 100 for generating customer solutions using real-time information for new customer sales and/or current customer support, reference is made to FIG. 1. In one implementation, a user accesses and interacts with a sales engineering tool 102 via a network 106 using a user device 104 to access, create, and edit customer solutions. The network 106 may be any computing network, including, without limitation, the Internet, a local intranet, a Virtual Private Network (VPN), and/or the like.

The user may be any authorized personnel, such as a member of a sales team, a member of a sales engineering team, a member of a provisioning team, or a customer. The sales team is responsible for the initiation and general oversight of an order by the customer for telecommunication products, such as Dedicated Internet Access (DIA), Internet Protocol (IP) VPN, voice services, managed services, and the like. The provisioning team is responsible for the provision of the installed telecommunication products. The sales engineering team bridges the gap between sales team and the provisioning team. Generally, sales engineers interface with the customer during both the pre-sales phase to generate a design and quote for the customer and the post-sales phase to analyze customer inventory and usage and to troubleshoot.

The user device 104 is generally any form of computing device capable of interacting with the network 106, such as a personal computer, terminal, workstation, portable computer, mobile device, tablet, multimedia console, and the like. In one implementation, the sales engineering tool 102 provides multiple user interface support, including, without limitation, a touch screen, touch pads, mouse and other device input, as well as multiple browser support. The network 106 is used by one or more computing or data storage devices (e.g., one or more databases 110 or other computing devices) for implementing sales engineering tool 102 and other services, applications, or modules in the network environment 100 or described herein.

In one implementation, the network 106 includes at least one server 108 hosting a website or an application that the user may visit to access the sales engineering tool 102 and/or other network components. The server 108 may be a single server, a plurality of servers with each such server being a physical server or a virtual machine, or a collection of both physical servers and virtual machines. In another implementation, a cloud hosts one or more components of the network environment 100. The user devices 104, the server 108, the database 110, and other resources connected to the network 106 may access one or more other servers to access to one or more websites, applications, web services interfaces, storage devices, computing devices, or the like that are used generating customer solutions, customer service analytics, and/or quoting information. The server 108 may also host a search engine that the sales engineering tool 102 uses for accessing, searching for, and modifying designs, customer solutions, customer information, consolidated inventory, technical infrastructure data, customer service analytics, and other data.

As can be understood from FIG. 1, in one implementation, the sales engineering tool 102 obtains and consolidates inventory for a telecommunication provider reflecting network assets and capabilities. The inventory, may be, for example, logical and physical inventory of telecommunications products, including, without limitation, DIA, VPN, voice services, managed services, and the like. The sales engineering tool 102 generates a design for a customer solution using the consolidated inventory. The design integrates network assets and capabilities with customer information, including location information for customer sites to accurately estimate proposed solutions to customer requests. In one implementation, the sales engineering tool 102 generates the design for a proposed customer solution and in some cases an estimated cost of the proposed customer solution through the use of an intuitive Graphical User Interface (GUI).

In one implementation, to access the sales engineering tool 102, the user is directed to enter login credentials, which are authenticated by the sales engineering tool 102. To begin the process, the sales engineering tool 102 displays a list of sales opportunities for current and potential customers. The user may select one of the sales opportunities to create a proposed customer solution for the sales opportunity. For a selected sales opportunity, the sales engineering tool 102 generates a map view of a technical infrastructure of the provider network overlaid with a geographic location of each of the customer sites. The customer sites may be obtained from various sources, including, without limitation, the database 110, manual entry, a remote source (e.g., a customer database), and/or the like. The customer sites may be existing or prospective locations. The sales engineering tool 102 or another internal or external system may discover the customer sites and display the locations of the customer sites on the map view. For example, the sales engineering tool 102 may discover the customer sites based on the name of the customer. In one implementation, the sales engineering tool 102 matches one or more telecommunication products to the selected opportunity, which is displayed on the map.

The sales engineering tool 102 determines whether each of the customer sites is a known location and whether each of the customer sites is on-net (i.e., on the provider network) or off-net (i.e., not on the provider network). If the location is unknown, an address or a geocode for the location may be provided. Where the customer site is off-net, the sales engineering tool 102 auto routes the customer site to a network access point and provides the route options for review and selection. In one implementation, the customer site is auto routed using off-net services and/or new infrastructure for installation. The ranking of the route options may be determined based on a build cost of each of the routes. Generally, the highest ranked auto route is the least cost pathway to the nearest on-net access point. Depending on the build costs of the auto routes, each of the customer sites is treated either as on-net or off-net. Stated differently, a distance from the on-net provider network may be used to calculate a hard-cost estimate for installing new infrastructure and/or using off-net services. The sales engineering tool 102 determines the lowest cost way of adding the location to the provider network depending on off-net provider capabilities and the cost to add the new infrastructure. If the cost of installing new infrastructure is deemed to be the most-effective way of providing the telecommunication products at the customer site, a request for a field estimate may be created. In one implementation, the sales engineering tool 102 configures the customer site based on whether the telecommunication products will be configured using on-net services, off-net services, or a combination of services. The sales engineering tool 102 matches the telecommunication products to the customer site according to the desired uses of the customer.

To match telecommunication products to the sales opportunity at the customer sites, an automatically generated logical diagram view is provided and updated in substantially real time based on user input. Using the diagram, the user may select and interconnect graphical icons representative of different inventory types to create a design for a proposed customer solution addressing the opportunity. In one implementation, to facilitate readability, the sales engineering tool 102 automatically aligns the graphical icons based on the selected telecommunication products, the number of customer sites, and the like to provide an overall symmetry of the diagram. The design may leverage information about the customer's current services in conjunction with the technical infrastructure information for the provider network. In one implementation, each of the customer sites are configured for the telecommunication products individually. In another implementation, multiple customer sites are bulk configured as a group. The sales engineering tool 102 may assist the configuration process by adapting the configuration in real time as the user input information. For example, based on input by the user, the sales engineering tool 102 may automatically populate information fields and design attributes accordingly. Further, the sales engineering tool 102 may indicate a completeness of the configuration using one or more visual cues. For example, whether a site or product is complete, incomplete, or unquotable may be indicated using color coding. The sales engineering tool 102 may provide in building capabilities for configuring a customer site by building area, such as floors, rooms, racks, ports, and the like.

To determine a viability of the proposed customer solution, the sales engineering tool 102 calculates an expected performance of the telecommunication products using technical infrastructure data of the telecommunication provider with respect to the customer sites. For example, a site to site latency estimate, a throughput estimate, a speed of light estimate, and the like may be calculated to determine an expected performance of the telecommunication products. Based on the expected performance, the proposed customer solution may be revised accordingly until customer expectations are met. In one implementation, the sales engineering tool 102 supports multiple design versions, permitting a user to access and use prior versions of a design. The difference between one design version to another may be defined using the sales engineering tool 102. A system message history may further be used to track modifications and entries relating to customer solutions. Stated differently, the sales engineering tool 102 creates a log of all activity for a design, including a message detailing the activity and a classification of the activity. For example, the classification may include, without limitation, information added, warning, error, loading, and fatal issue.

Once the proposed customer solution is completed, the sales engineering tool 102 may determine costs associated with the proposed customer solution, which may be used to generate a quote and/or pull attributes from a quoting source. The sales engineering tool 102 presents design and/or quote in a user-friendly format enabling the customer to review and approve the proposed customer solution. In one implementation, the sales engineering tool 102 prompts the customer for approval and confirms the receipt of a customer signature and date stamp approving the proposed customer solution. The customer may use the sales engineering tool 102 to update the design and/or the details associated with the proposed customer solution to ensure the end installation matches the approved design.

To ensure continued customer satisfaction, in one implementation, the sales engineering tool 102 provides customer service analytics in a network explorer view. Stated differently, the sales engineering tool 102 may leverage customer service inventory (CSI) in creating new designs assessing installed assets, such as products and locations. In one implementation, the customer service analytics includes a customer footprint representing a current state of a customer network, including a performance of the products. The sales engineering tool 102 may also be used to view a circuit from site to site and analyze all circuit attributions. Further, any trouble tickets opened to investigate a customer complaint or problem for the circuit may be shown. In one implementation, the sales engineering tool 102 generates customer analytics providing an actual performance of the one or more telecommunication products. For example, a measured site to site latency, a measure throughput (i.e., a calculated packet overhead), and/or other latency, capacity, or performance attributes may be provided. The customer service analytics may also provide a security report detailing security incidents at the customer sites. In one implementation, the sales engineering tool 102 may automatically suggest network assets or capabilities for optimizing the performance of the telecommunication products or for otherwise meeting the customer's expectations. For example, the suggestions may include, without limitation, capacity increases, diversity, security, product modifications, and the like. In some cases, a software defined networks (SDN) front end tool may be used to make changes to the physical network using an application program interface (API) based on the suggestions. As such, the sales engineering tool 102 builds customer solutions for existing customers by changing logical descriptions rather than by building physical hardware, thereby immediately implementing a suggestion or customer solution.

Figure 2:
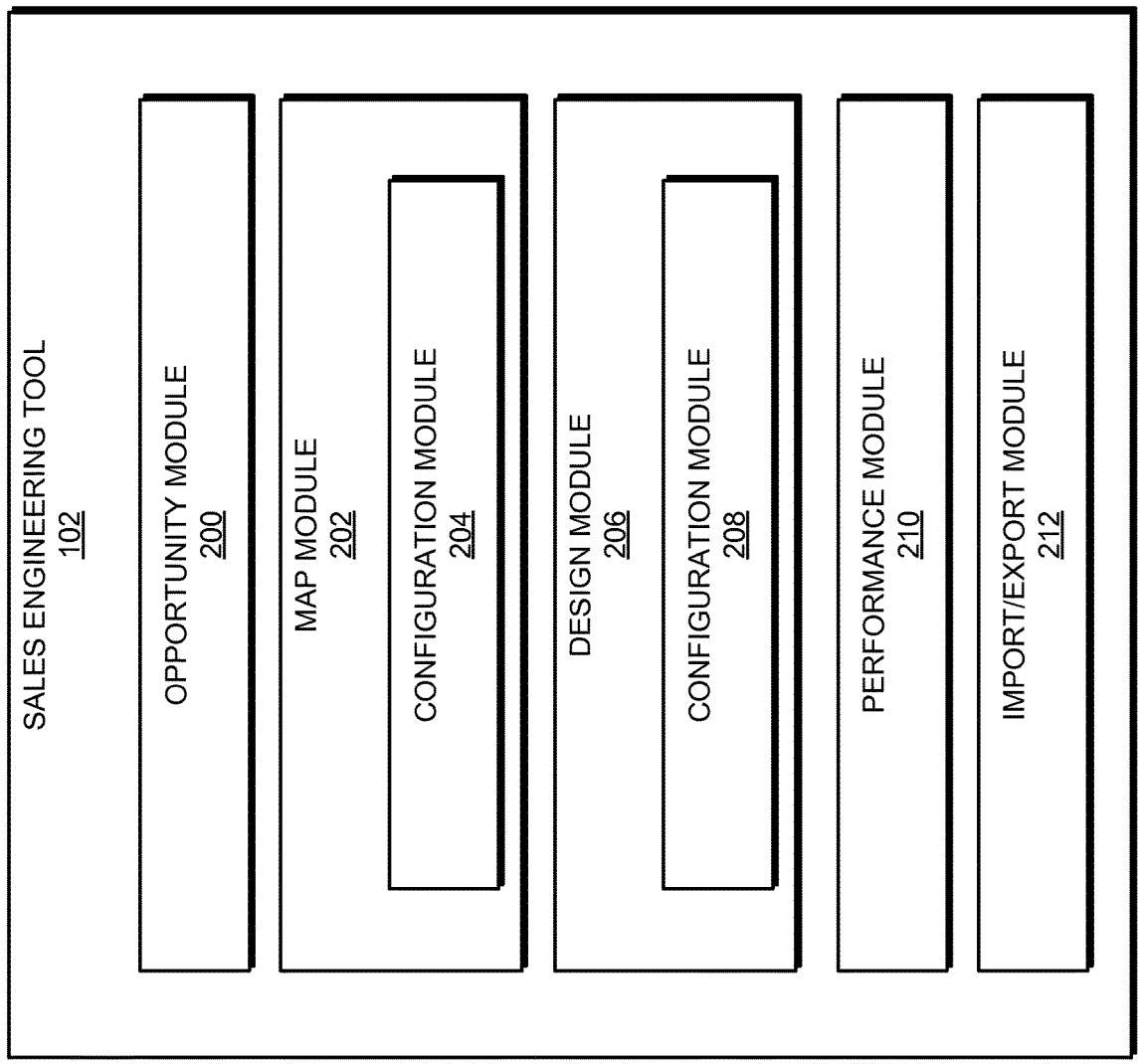
FIG. 2 illustrates the sales engineering tool providing example modules executed by the at least one server or other computing device.

Referring to FIG. 2 example modules provided by the sales engineering tool 102 and executed by the server 108 or other computing device are shown. In one implementation, the sales engineering tool 102 includes an opportunity module 200, a map module 204, a design module 206, configuration modules 204 and 208, a performance module 210, and an import/export module 212. However, fewer or more modules and/or various combinations are contemplated. The import/export module 212 may be configured to provide a bulk transfer of data to and from one or more databases (e.g., the database 110) or external sources, including but not limited to, a quoting database, an order database, a product catalog, a service image of installed assets, static documents, and the like.

In one implementation, the opportunity module 200 retrieves a plurality of sales opportunities for one or more existing and/or potential customers. The sales opportunities may be imported from an outside source, such as the database 110 or other internal or external source(s). The opportunity module 200 extracts and filters information pertaining to the sales opportunities and presents the information to a user for review, editing, and selection. In one implementation, the sales opportunities are filtered based one or more of: a stage (e.g., won, lost, open, closed, etc.); an opportunity name; a customer name, and the like. The opportunity module 200 may present information relating to the sales opportunities including, for example, when the opportunity was last modified, a monthly recurring fee amount, a non-recurring fee amount, a product name, and/or any information required for CRM and quoting. A sales opportunity may be selected using the opportunity module 200 to create a design for a customer solution addressing the selected sales opportunity.

The map module 202 is configured for displaying a map showing various geographical features, such as streets, buildings, rivers, bridges, and the like, overlaid with geographical attributes of a technical infrastructure of a provider network that may be used, in whole or in part, in designing a customer solution for a selected sales opportunity. In other words, the map module 202 provides a map populated with customer information and technical infrastructure data from the database 110 and/or other sources. The customer information may include customer locations along with current customer services and infrastructure, if any. The technical infrastructure data may include any network infrastructure that is relevant for the current map being displayed. In one implementation, the relevant network infrastructure includes an increased level of detail corresponding to the size of the geographic area displayed. For example, the map module 202 may display a map of a country, such as the United States, with relevant network infrastructure including long haul fiber optic lines and other major technical infrastructure data. When the map is zoomed in to focus on a relatively small geographic area, such as a few square miles of a city, the relevant network infrastructure may include a corresponding increased level of detail, such as short haul fiber optic lines and off-net lines. In one implementation, the map module 202 may also be configured to display building information, which may be retrieved from the database 110 and/or other internal or external sources. The building information may include network services and infrastructure already present in the building on a per building basis, or may be broken down by room, area, or floor of the building, by tenants, by racks or ports, or otherwise.

The map module 202 may generate an adjustable map. In one implementation, the available adjustments include, without limitation: panning and zooming to different areas of the map; obtaining a current location; searching for a customer site; and displaying streets, satellite images, and hybrid views. The map may also be filtered, for example, to toggle: the display of network infrastructure, such as fiber; the display of customer sites; the display of buildings or other geographical features; and the display according to network bandwidth, available bandwidth; and the display according to only on-net services.

In one implementation, the map module 202 includes the configuration module 204. The configuration module 204 is configured to add products to a selected location. Stated differently, the user may select a customer site on the map and one or more products to install or otherwise provide at the customer site. In one implementation, when a site is selected by a user, the configuration module 204 may automatically designate available actions for the site. The available action may include, without limitation: designating applications for the site; selecting a product or solution for use at the site; providing design attributes of the site; checking a network capacity that is currently available at the site; measuring a network latency at the site; setting the site as an A-end or a Z-end; auto-routing the site to an on-net network access point; displaying a view shed; displaying voice capabilities; showing a route elevation; and inspecting a channelization of the site.

In adding a customer site to the map, in one implementation, the map module 202 provides an address of the customer site and measures the distance between any two sites on the map. The map module 202 may designate a group type of each customer site (e.g. headquarters, call center, data center, branch office, remote office, customer site, unassigned, etc.). In one implementation, the map module 202 initiates the configuration of products between sites. The configuration of products generally involves selecting a customer site and configuring the site for the product.

In one implementation, the design module 206 provides an automatically generated logical diagram view of a design for a customer solution addressing the selected opportunity. In other words, the design module 206 depicts a network diagram of a proposed design for the customer network. In one implementation, the network diagram includes the customer's physical sites along with any logical connections and products linking the sites. The design module 206 configures products and network infrastructures at one or more customer sites. Using the design module 206, a user may view a plurality of sites and select products or solutions that the customer desires between the sites.

In one implementation, the design module 206 includes the configuration module 208, which may provide drag-and-drop functionality. The configuration 208 module logically creates or edits the design of the customer network for the proposed customer solution. The configuration module 208 may access previously entered customer data stored in the database 110 or obtain customer data from other internal or external sources. In one implementation, the configuration module 208 automatically discovers and displays the customer sites and current products. Customer sites and products may also be manually entered using the configuration module 208. As discussed above, in one implementation, each site is assigned a group type to differentiate logical groupings of sites with similar attribute values or service requirements. To select one or more telecommunication products for each site, a user may drag and drop products from a menu at each site using the configuration module 208. A telecommunication product may include, without limitation, DIA, IPVPN, and Private Line and Voice individually or collectively in other logical groupings, such as IPVPN+DIA+Voice, IPVPN+DIA, or DIA+Voice. After selecting one or more products using the design module 206, a start point at a first customer site and an end point at a second customer site are selected to create a network design. The design module 206 quickly builds large scale network designs with customer facing interaction. The sales engineering tool 102 is intuitive and user friendly, such that customers can create their own network designs and review and approve proposed customer solutions.

In one implementation, the performance module 210 is configured to generate reports detailing an expected performance of one or more products in a proposed customer solution or an actual performance of an existing customer network including the current products and solutions utilized by the customer. The performance information may include, without limitation, site-to-site latency in milliseconds, a throughput of each site in megabits per second, resiliency, bandwidth, or any other performance characteristics. Latency may be estimated using a distance between sites and a percentage of the speed of light constant at which data the is estimated to be transmitted between the sites. Throughput may be estimated using a rate of data that may be transmitted over a site.

Figure 3:
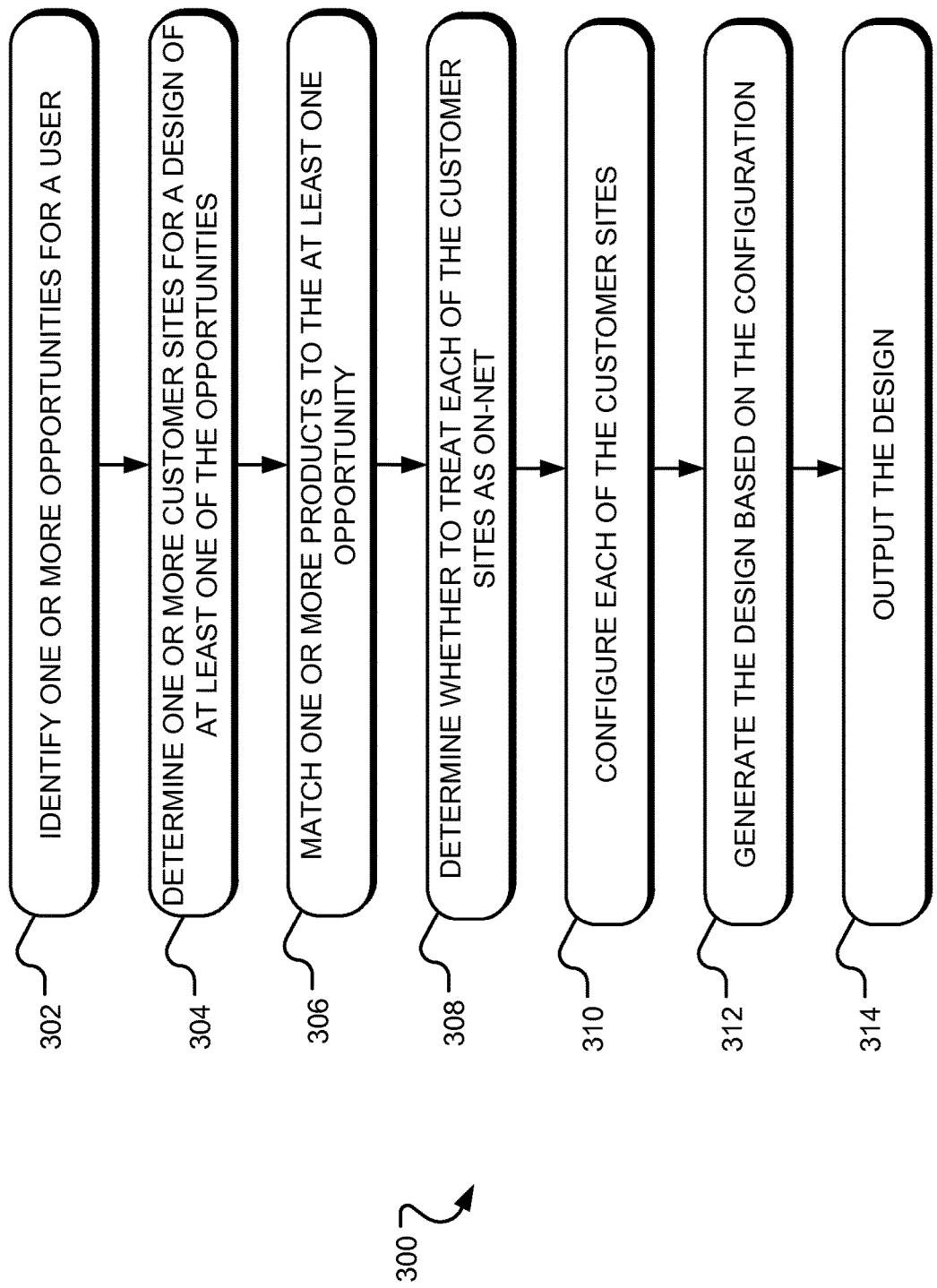
FIG. 3 illustrates example operations for generating a customer solution.

For a detailed description of example operations 300 for generating a customer solution, reference is made to FIG. 3. In one implementation, an operation 302 identifies one or more opportunities for a user. The opportunities identified are sales opportunities that the user is authorized to review, edit, and/or create solutions for one or more existing and/or potential customers. The operation 302 may identify sales opportunities based on a stage (e.g., won, lost, open, closed, etc.), an opportunity name, a customer name, and the like.

An operation 304 determines one or more customer sites for a design of a customer solution addressing at least one of the identified opportunities. The operation 304 may obtain the customer sites from various sources, including, without limitation, the one or more internal databases, manual entry, a remote source (e.g., a customer database), and/or the like. The customer sites may be existing or prospective locations. In one implementation, the operation 304 automatically discovers the customer sites based on the name of the customer. An operation 306 matches one or more products to the selected opportunity. The operation 306 may display the matched products on a map.

In one implementation, an operation 308 determines whether to treat each of the customer sites as on-net. If the location of the site is unknown, an address or a geocode for the location may be provided. In one implementation, where the customer site is off-net, the operation 308 auto routes the customer site to a network access point and provides the route options for review and selection. The ranking of the route options may be determined based on a build cost of each of the routes. Generally, the highest ranked auto route is the least cost pathway to the nearest on-net access point. Depending on the build costs of the auto routes, the operation 308 determines whether to treat each of the customer sites as on-net or off-net. An operation 310 configures the customer site based on whether the products will be configured using on-net services, off-net services, or a combination of services. An operation 312 generates the design for the proposed customer solution addressing the opportunity based on the configuration of each of the customer sites, and an operation 314 outputs the design. In one implementation, the operation 314 outputs the design for display on a GUI.

FIGS. 4-23 show example user interfaces generated by the sales engineering tool 102 and displayed in a browser window of the user device 104 through which access to and interactions with opportunities, designs, customer service analytics, and other data are provided. It will be appreciated by those skilled in the art that such depictions are exemplary only and not intended to be limiting.

As can be understood from FIGS. 4-23, in one implementation, the sales engineering tool 102 generates a user interfaces with tabs 402-406 to navigate between opportunities, designs, and a network explorer providing customer service analytics, respectively. It will be appreciated that more or fewer tabs may be provided for navigating to and from different data relating to customer solutions.

Figure 4:
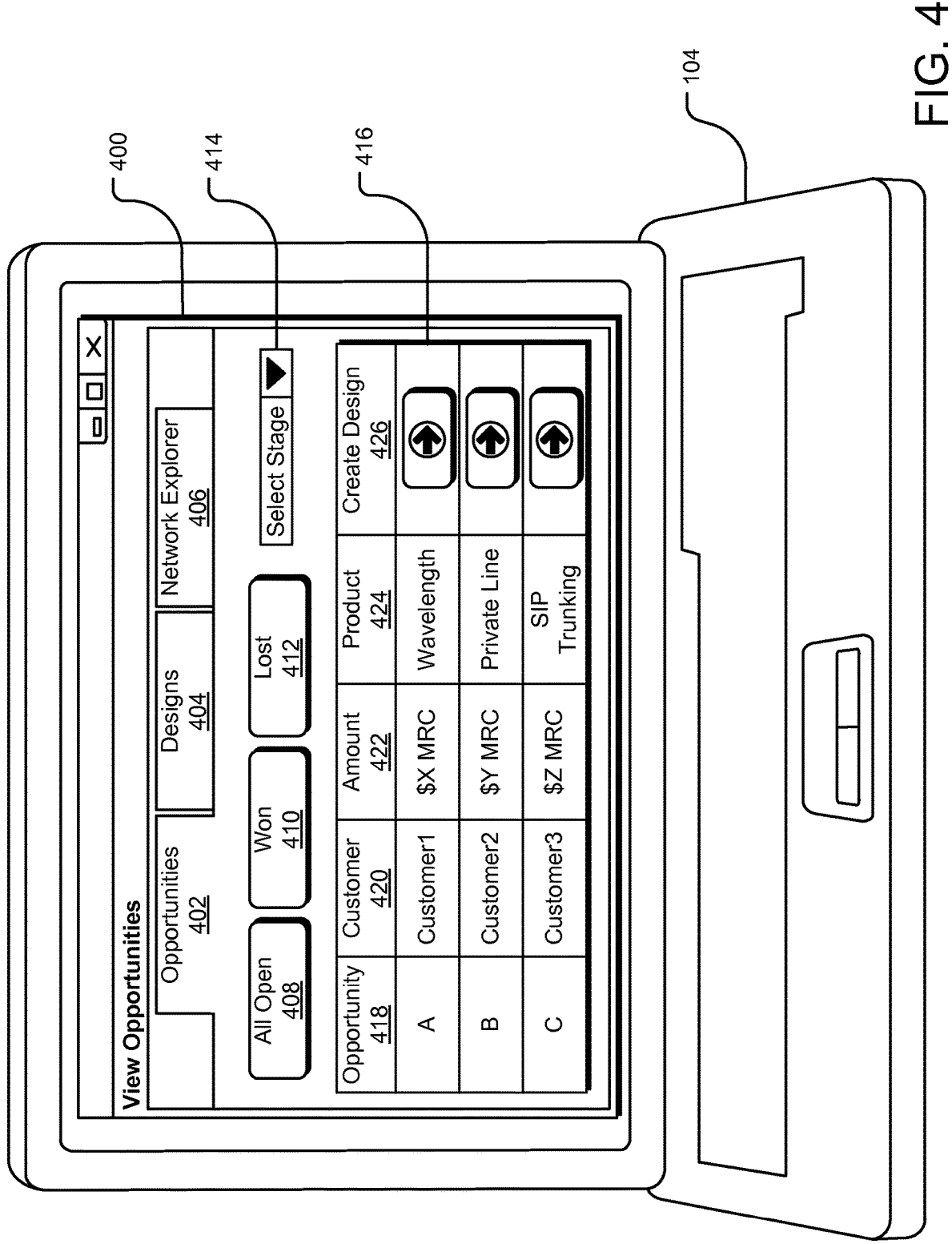
FIG. 4 shows a view opportunities user interface displaying opportunities for providing a customer solution to new and/or existing customers.

Turning to FIG. 4, a view opportunities user interface 400 displaying opportunities for providing a customer solution to new and/or existing customers is shown. In one implementation, the opportunities presented with the view opportunities user interface 400 may be filtered using buttons 408-412 and/or a stage drop-down menu 414. For example, the all open button 408 may be selected to display all opportunities that are open, the won button 410 may be used to present all opportunities that were won, and the lost button 412 may filter the opportunities to those that were lost. The stage drop-down menu 414 may be used to select a stage of an opportunity in the sales process to filter the opportunities. Opportunities may also be searched for using one or more attributes of the opportunity, including, for example, an opportunity identifier, a customer name or other identifier, when the opportunity was last modified, a monthly recurring cost, a non-recurring cost, a product name, or any information for CRM and quoting.

The results of the filters and/or search may be presented in a table 416 detailing relevant opportunities. The table 416 may display various attributes of the opportunities, such as an opportunity identifier 418, a customer identifier 420, an amount 422 (e.g., a monthly recurring cost, a non-recurring cost, etc.), a product 424, and the like. In one implementation, each of the displayed opportunities in the table 416 includes a link 426 to a user interface (e.g., a create design user interface 500) for creating or editing a design for a proposed customer solution addressing the corresponding opportunity.

Figure 5:
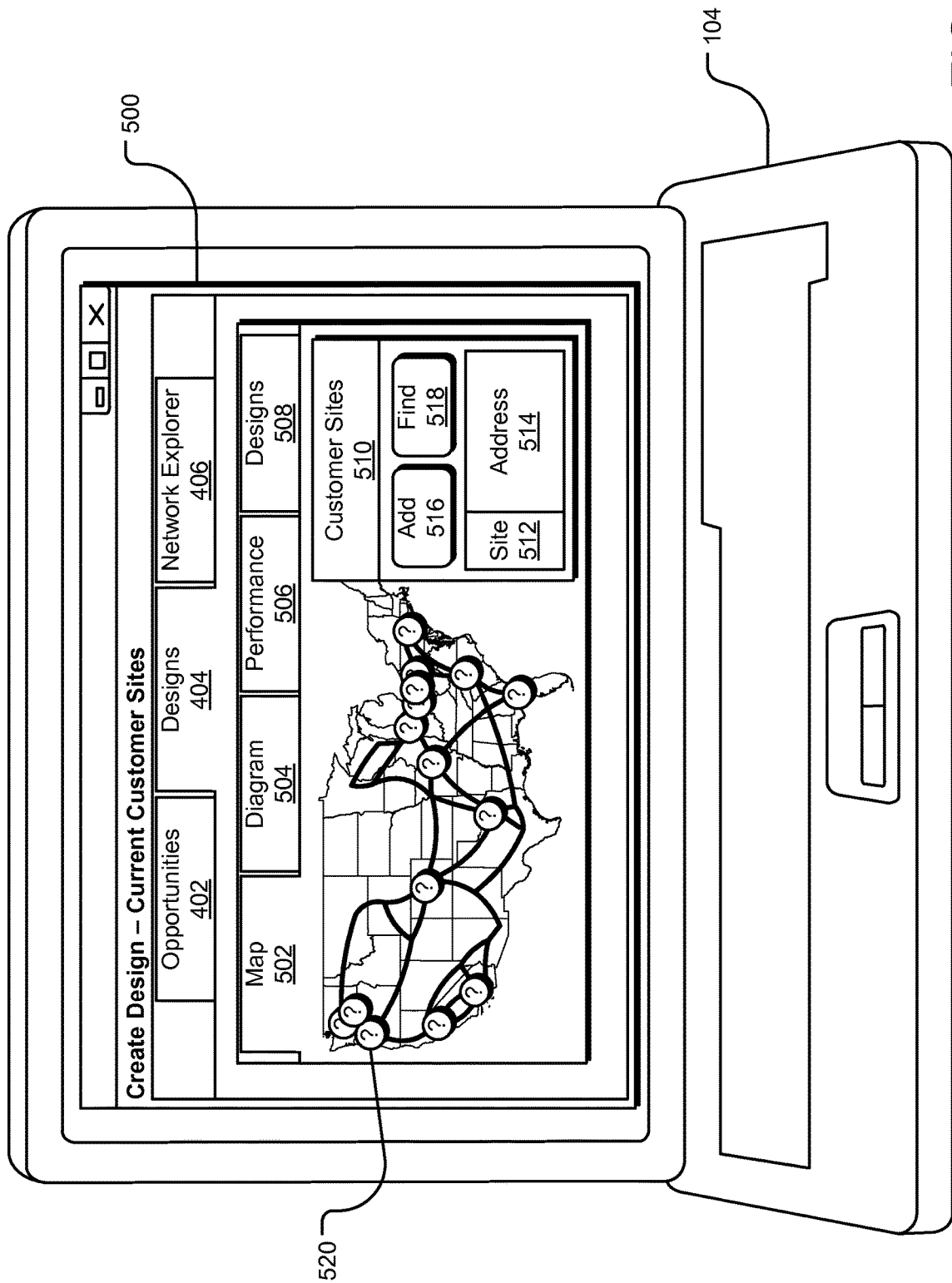
FIG. 5 displays a create design user interface providing an integrated map view of customer sites and provider network assets and capabilities.

FIG. 5 displays the create design user interface 500 for creating or editing a design for a proposed customer solution addressing the opportunity selected using, for example, the view opportunities user interface 400. As can be understood from FIG. 5, in one implementation, the sales engineering tool 102 generates the design user interface 500 with tabs 502-508 to navigate between a map view, a diagram view, performance estimates, and saved designs, respectively, for the selected opportunity. It will be appreciated that more or fewer tabs may be provided for navigating to and from different design data.

In one implementation, the map tab 502 provides an integrated map view of customer sites and provider network assets and capabilities. In other words, the map tab 502 provides a map populated with technical infrastructure data and customer information.

The technical infrastructure data may include any network infrastructure that is relevant for the current map being displayed. In the example of FIG. 5, the relevant network infrastructure shown in the thick dark lines, including long haul fiber optic lines and other major technical infrastructure data. However, the relevant network infrastructure may include an increased level of detail as a size of the geographic area displayed is adjusted. For example, if the map is zoomed in to focus on a relatively small geographic area, such as a few square miles of a city, the relevant network infrastructure may include a corresponding increased level of detail, such as short haul fiber optic lines and off-net lines. The map may also be focused on a building, broken down by: room, area, or floor of the building; tenants; racks; ports, or otherwise.

The customer information may include one or more customer sites 510 along with current customer services and infrastructure, if any. The customer sites 510 may be automatically discovered and presented on the map and in a list, including a site name 512 and address 514. The customer site may be an existing or prospective customer site. An add button 516 may be used to manually add additional customer sites, and a find button 518 may be used to search for or otherwise discover additional customer sites. Any additional customer sites added are displayed on the map and list. In the example shown in FIG. 5, a location 520 of each of the customer sites 510 is shown on the map. Because the customer sites 510 are unassigned, an icon with a "?" is shown at the locations 520. Once the customer sites 510 are assigned to a group, as detailed with respect to FIG. 6, an icon representing that group replaces the "?" icon.

Figure 6:
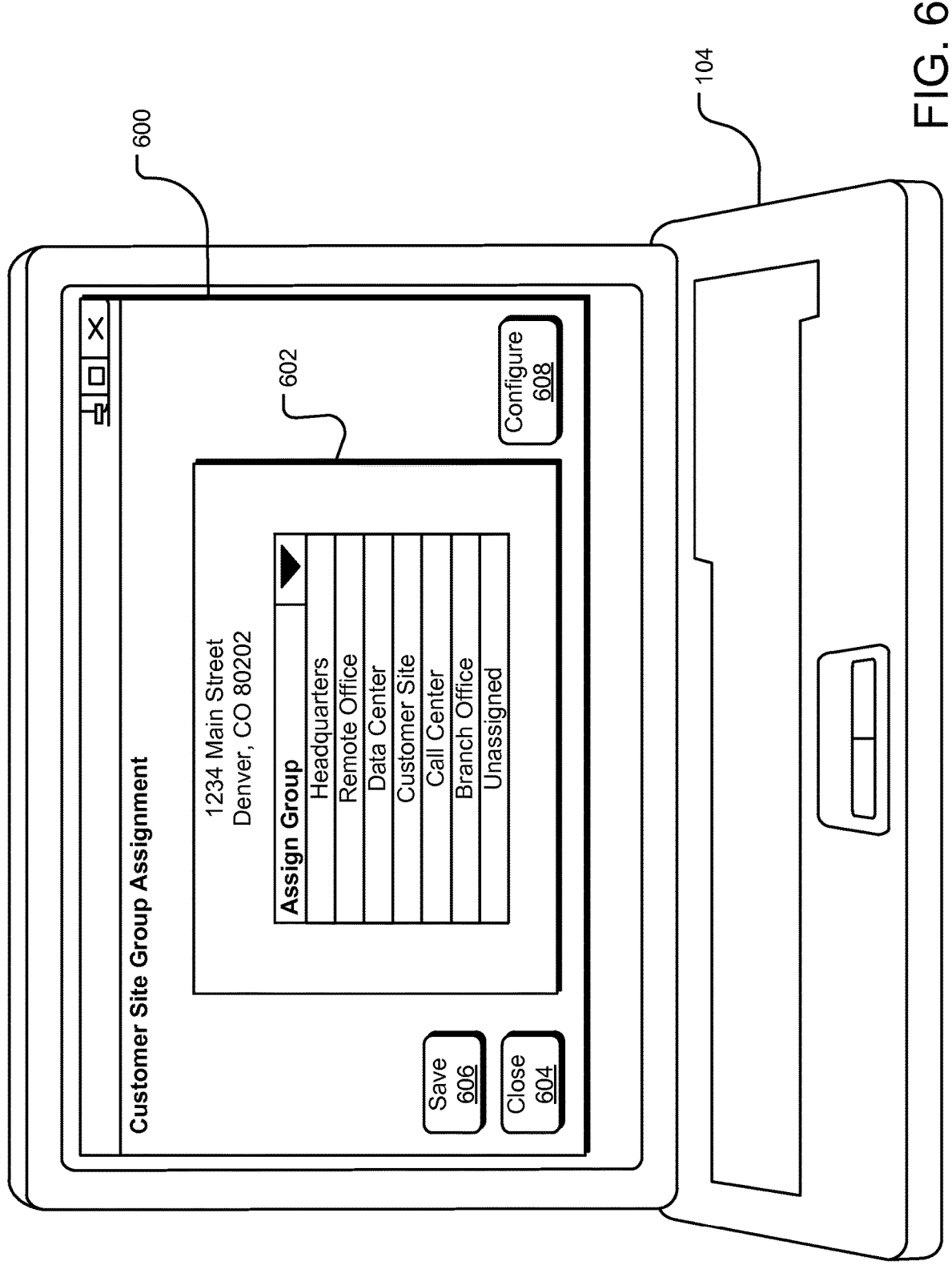
FIG. 6 shows a customer site group assignment user interface for assigning a customer site to a selected group.

FIG. 6 shows a customer site group assignment user interface 600 for assigning a customer site 510 to a selected group. In one implementation, one of the customer sites 510 is selected, for example, using the create design user interface 500, which displays a window 602 for editing the selected customer site. The window 602 may provide an address or other geographic location information for the selected customer site along with a drop down menu for assigning the customer site to a group type. In one implementation, the group types include, without limitation, headquarters, remote office, data center, customer site, call center, branch office, and unassigned. In some cases, multiple customer sites 510 may be selected to bulk assign the customer sites to a group type. Once the selected customer site is assigned to a group type, a save button 606 may be used to save the assignment, and a configure button 608 may be used to configure the selected customer site. A close button 604 may be used to exit the customer site group assignment user interface 600 without saving.

Figure 7:
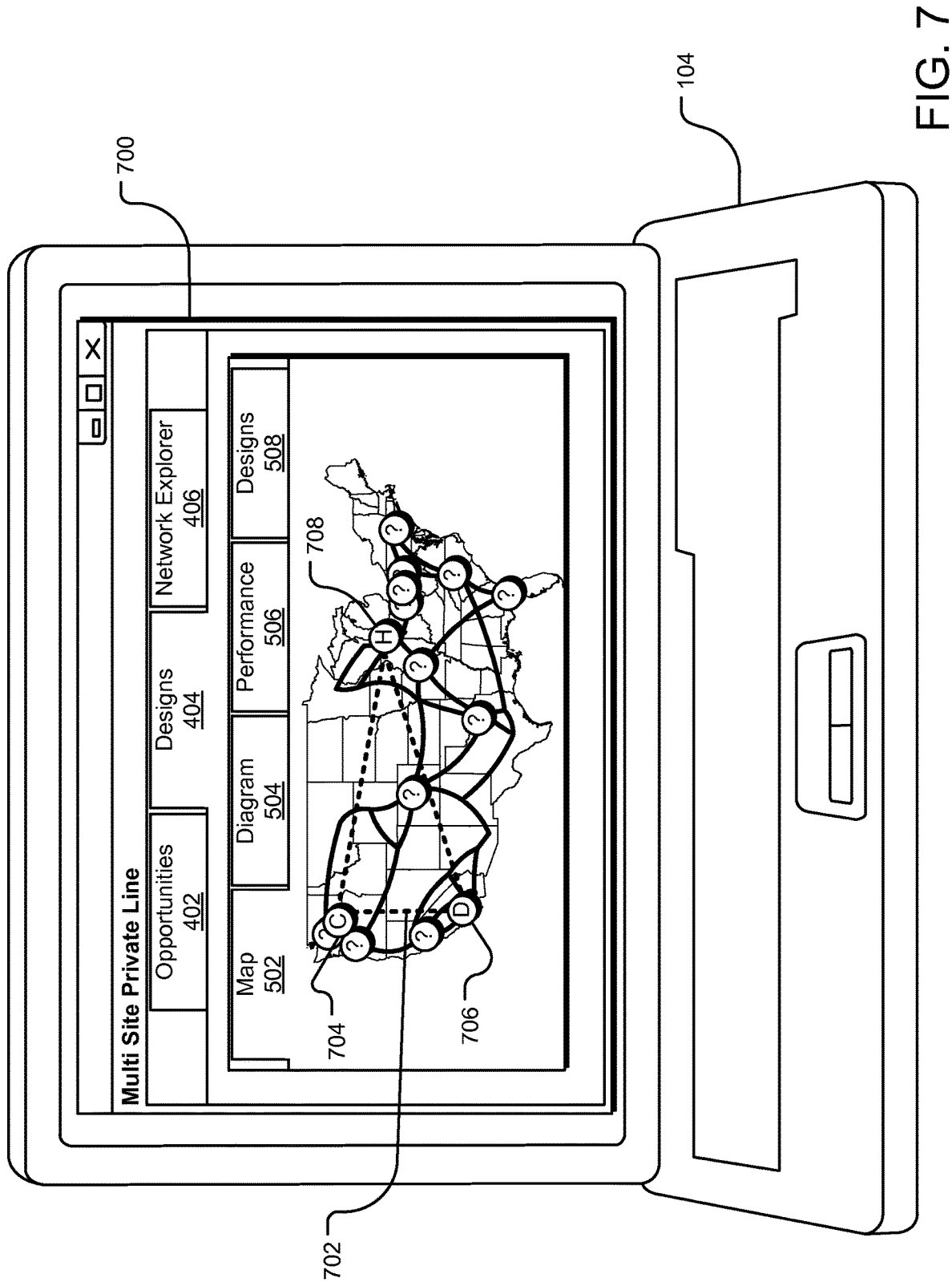
FIG. 7 illustrates a design user interface providing a map view of a multisite private line.

Once the customer sites 510 are assigned to a group type, an icon representing that group replaces the "?" icon, as shown in FIG. 7, which shows a design user interface 700 providing a map view of a multisite private line 702. As shown in FIG. 7, one of the customer sites 704 is assigned to the call center group, another customer site 706 is assigned to the data center group, and a third customer site 708 is assigned to the headquarters group. In one implementation, to initiate a configuration of the multisite private line, an A-end and a Z-end of the private line are configured with one or more selected customer sites and a port speed is selected. For example, the customer site 708 may be configured as the A-end, and another customer site (e.g., sites 704 and/or 706) may be configured as the Z-end.

Figure 8:
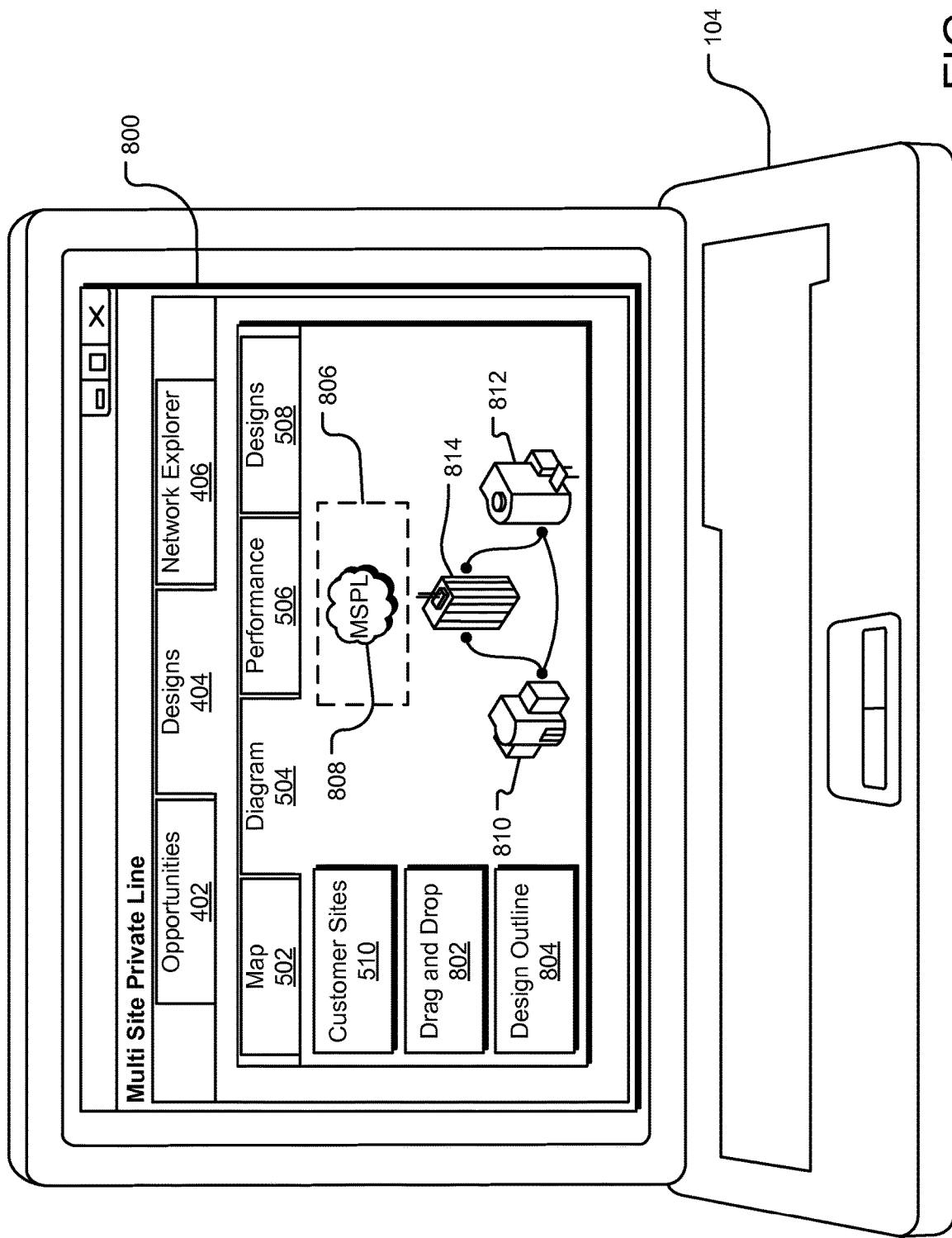
FIG. 8 shows another design user interface providing a diagram view of the multisite private line of FIG. 7.

In one implementation, to configure each of the customer sites 704-708, the diagram tab 504 may be selected, which navigates to another design user interface 800 providing a diagram view of the multisite private line, as shown in FIG. 8. The design user interface 800 may include various windows or menus in addition to the diagram view of the multisite private line. For example, a list of the customer sites 510 may be shown from which the user may select or drag-and-drop locations of one or more customer sites to add to the diagram view of the design. Further, a drag-and-drop menu 802 and a design outline 804 may be provided for adding products, sites, notes, and other design attributes to the design.

As can be understood from FIG. 8, the multisite private line is depicted in the diagram view of the provider network 806 as a cloud 808. The customer site 708 is shown in the diagram view with a headquarters icon 810, and the customer sites 704-706 are shown with the call center icon 812 and the datacenter icon 814, respectively. The connection 702 of the sites 704-708 is shown with lines in the diagram view. To modify the design and/or configure the sites 704-708, the drag-and-drop menu 802 and/or the design outline 804 may be used.

Figure 9:
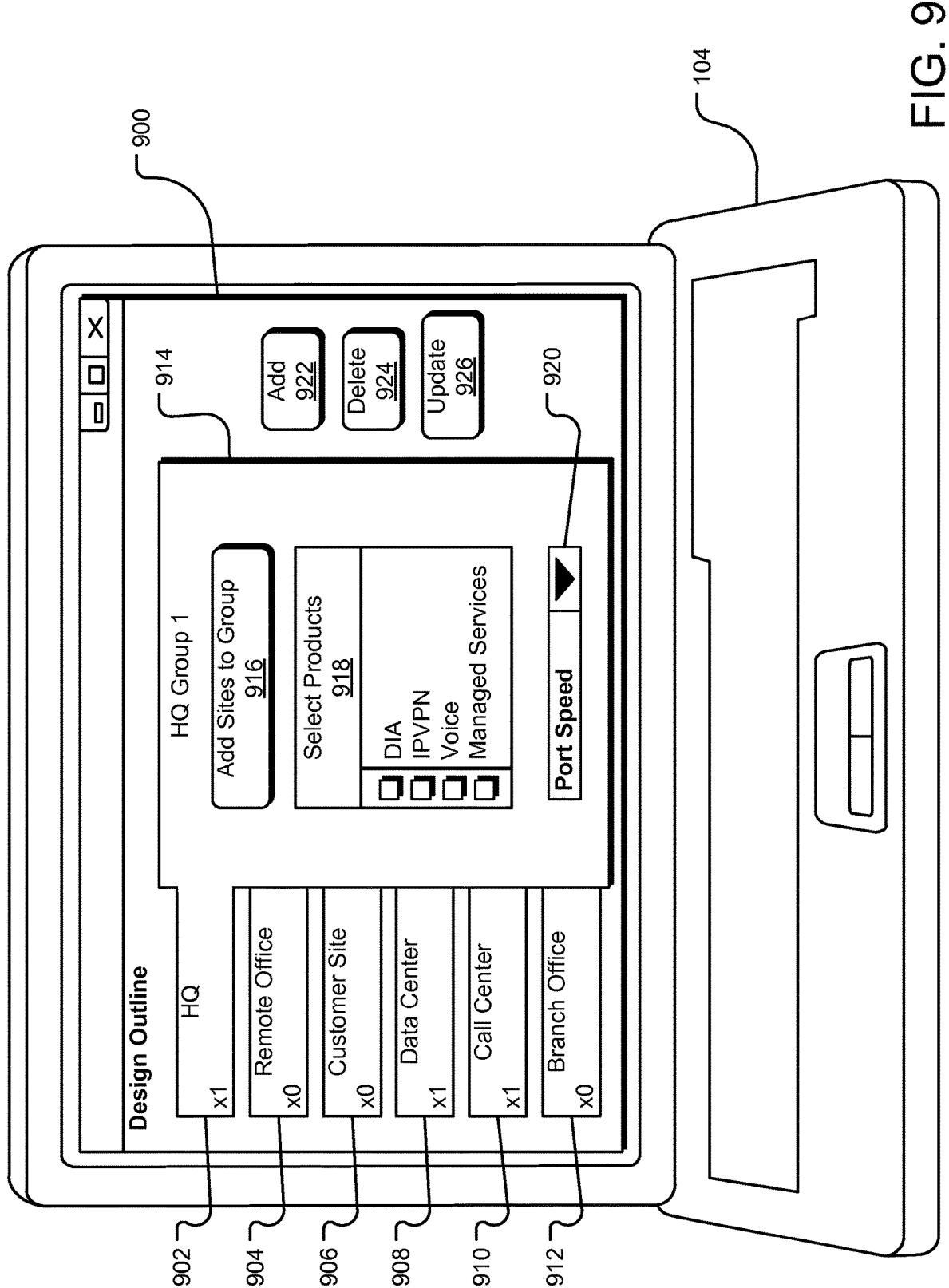
FIG. 9 depicts a design outline user interface for providing attributes of the design.

For a detailed description of the design outline 804, reference is made to FIG. 9, which depicts a design outline user interface 900 for providing attributes of the design. In one implementation, a tab for a group is selected to configure each of the customer sites included in the selected group. For example, the tabs may include, a headquarters tab 902, a remote office tab 904, a customer site tab 906, a data center tab 908, a call center tab 910, and a branch office tab 912. In one implementation, each of the tabs 902-912 provides a quick indication of how many customer sites are included in each group. For example, as shown in FIG. 9, the headquarters group 902, the data center group 908, and the call center group 910 each include one site, while the other groups 904, 906, and 912 include no sites. An add button 922 and a delete button 924 are provided for adding or deleting a group, respectively.

Selecting one of the tabs 902-912 opens a window 914 for configuring the sites in the group type. In one implementation, additional customer sites may be added to the selected group using an add site to group button 916 and/or by dragging one or more sites from the customer sites 510 to an icon (e.g., icons 810-814) in the diagram. To match products to one or more of the customer sites in the selected group, a select products menu 918 is provided for selecting one or more products to provide at the customer sites, including without limitation, DIA, IPVPN, voice, managed services, or some combination thereof. Various design attributes may be selected for each of the products, for example, as described with respect to FIGS. 11-14. In one implementation, a port speed 920 may be set for one or more of the customer sites in the selected group. In one implementation, the diagram view of the design is automatically updated as data is input into the design outline user interface 900. In another implementation, an update button 926 may be selected to update the design.

Figure 10:
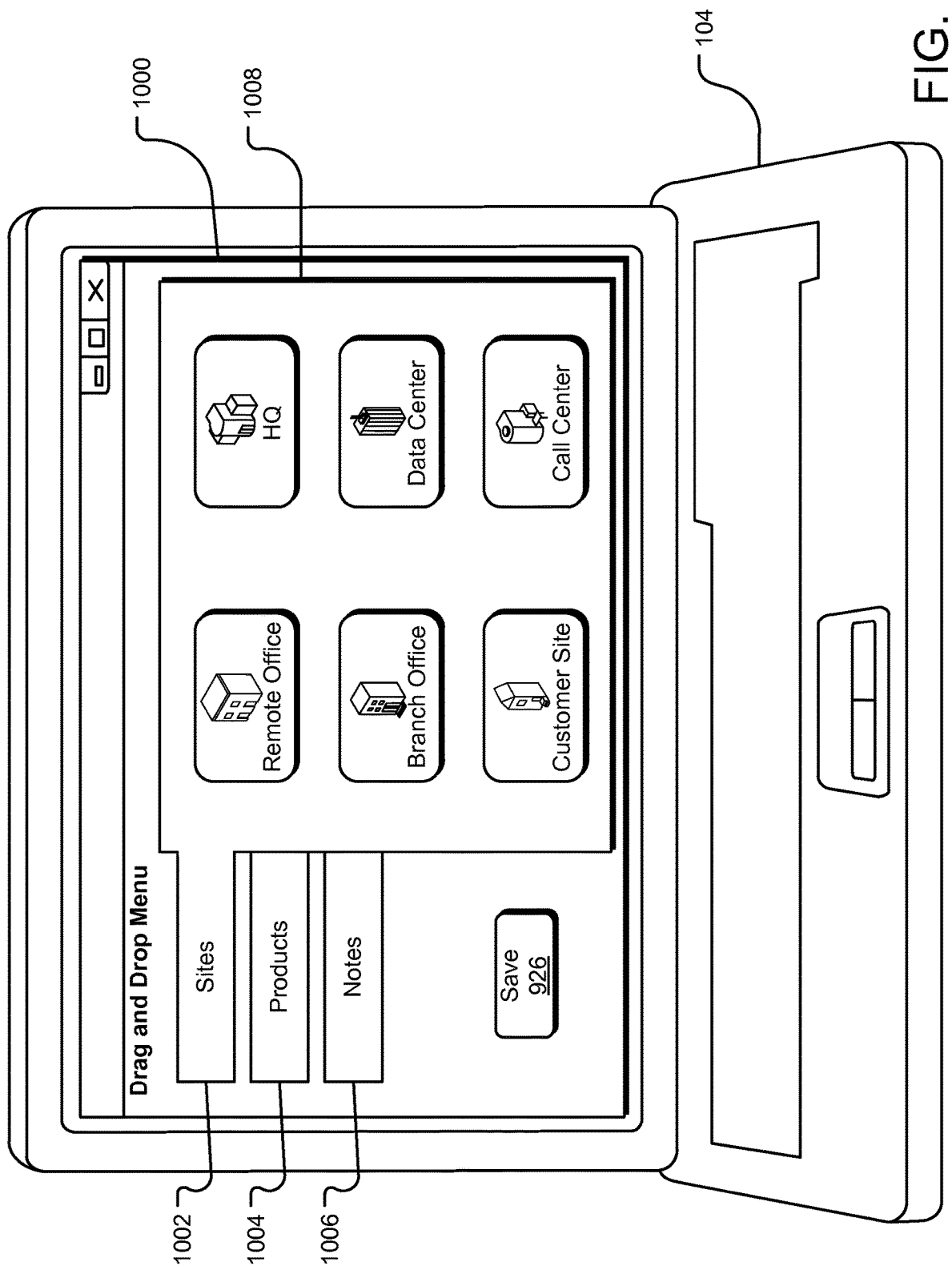
FIG. 10 illustrates a drag and drop user interface for providing attributes of the design.

FIG. 10 illustrates a drag-and-drop user interface 1000 for providing attributes of the design. In one implementation, a tab is selected for modifying or configuring various aspects of the design. For example, the tabs may include, without limitation, a sites tab 1002, a products tab 1004, and a notes tab 1006.

Selecting one of the tabs 1002-1006 opens a window 1008 with graphical icons for dragging and dropping into the diagram view of the design. For example, the sites tab 1002 includes graphical icons of each of the different group types, including a remote office icon, a headquarters icon, a branch office icon, a data center icon, a customer site icon, and a call center icon. To add a group type to the design, the icon representing that group type is dragged from the window 1008 to the diagram. In some cases, the group may include one or more customer sites when it is dragged to the diagram. Further, customer sites may be added to the group by dragging and dropping the site onto the group icon, for example, from the list of customer sites 510. To add a product to one or more sites or groups, an icon representing the product may be dragged to the diagram. The product icons may include, without limitation, a DIA icon, an IPVPN icon, a voice icon, a managed services icon, or the like. Similarly, notes may be input and dragged and dropped to various areas on the diagram as text boxes or to add comments on one or more product, sites, or groups.

For a detailed description of example design attributes that may be selected for each of the products, reference is made to FIGS. 11-14. It will be appreciated that these design attributes are exemplary only and not intended to be limited. Other products and design attributes are contemplated. In some implementations, as design attributes for a product are input, other attributes are automatically populated based on the input to expedite configuration and prevent errors.

Figure 11:
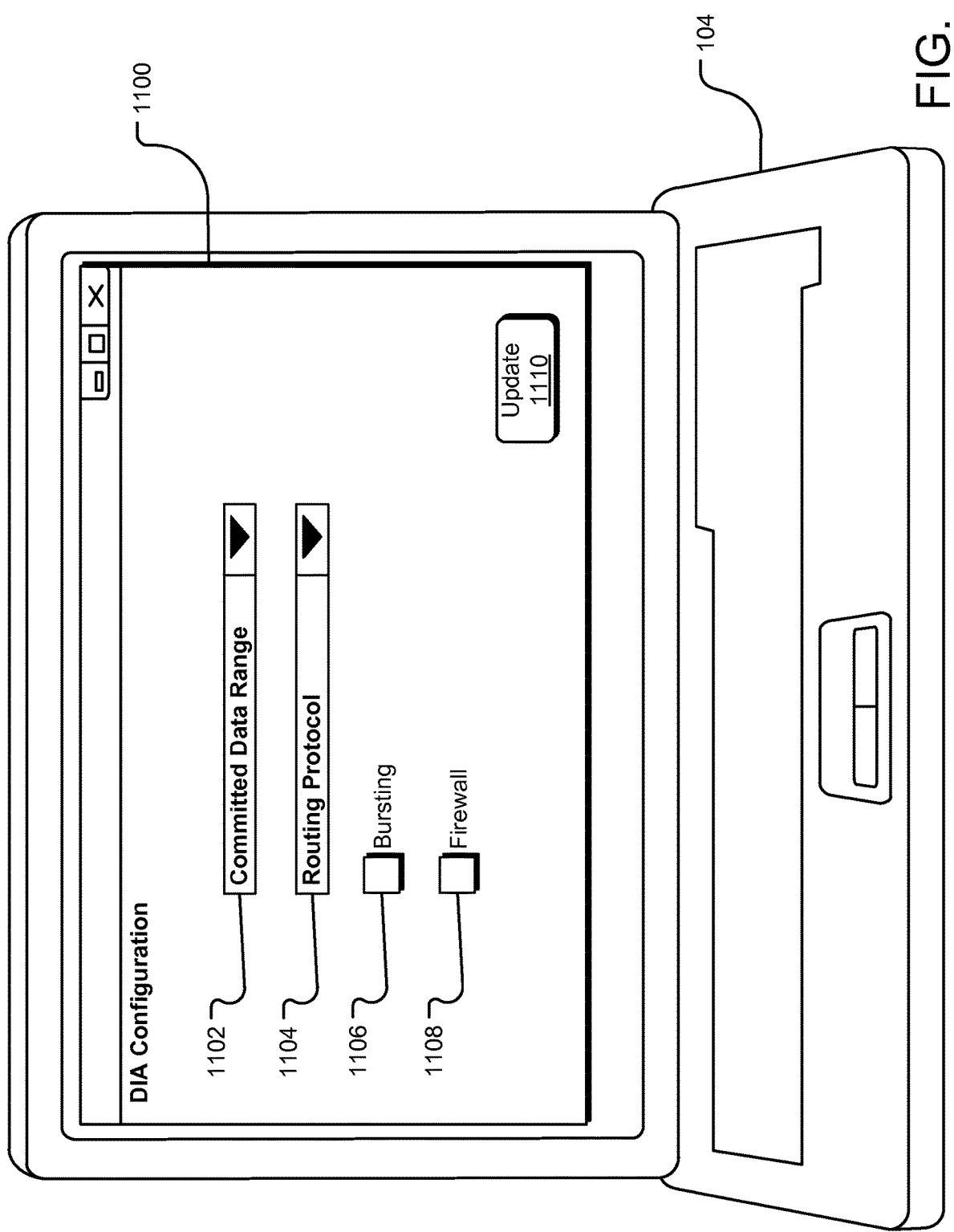
FIG. 11 shows a product configuration user interface for configuring Dedicated Internet Access (DIA) for one or more customer sites or groups.

Turning to FIG. 11, a product configuration user interface 1100 for configuring DIA for one or more customer sites or groups is shown. In one implementation, the design attributes for the DIA include, without limitation, a committed data range 1102, a routing protocol 1104, a bursting option 1106, and a firewall option 1108. In one implementation, the diagram view of the design is automatically updated as data is input into the product configuration user interface 1100. In another implementation, an update button 1110 may be selected to update the design with the DIA configuration.

Figure 12:
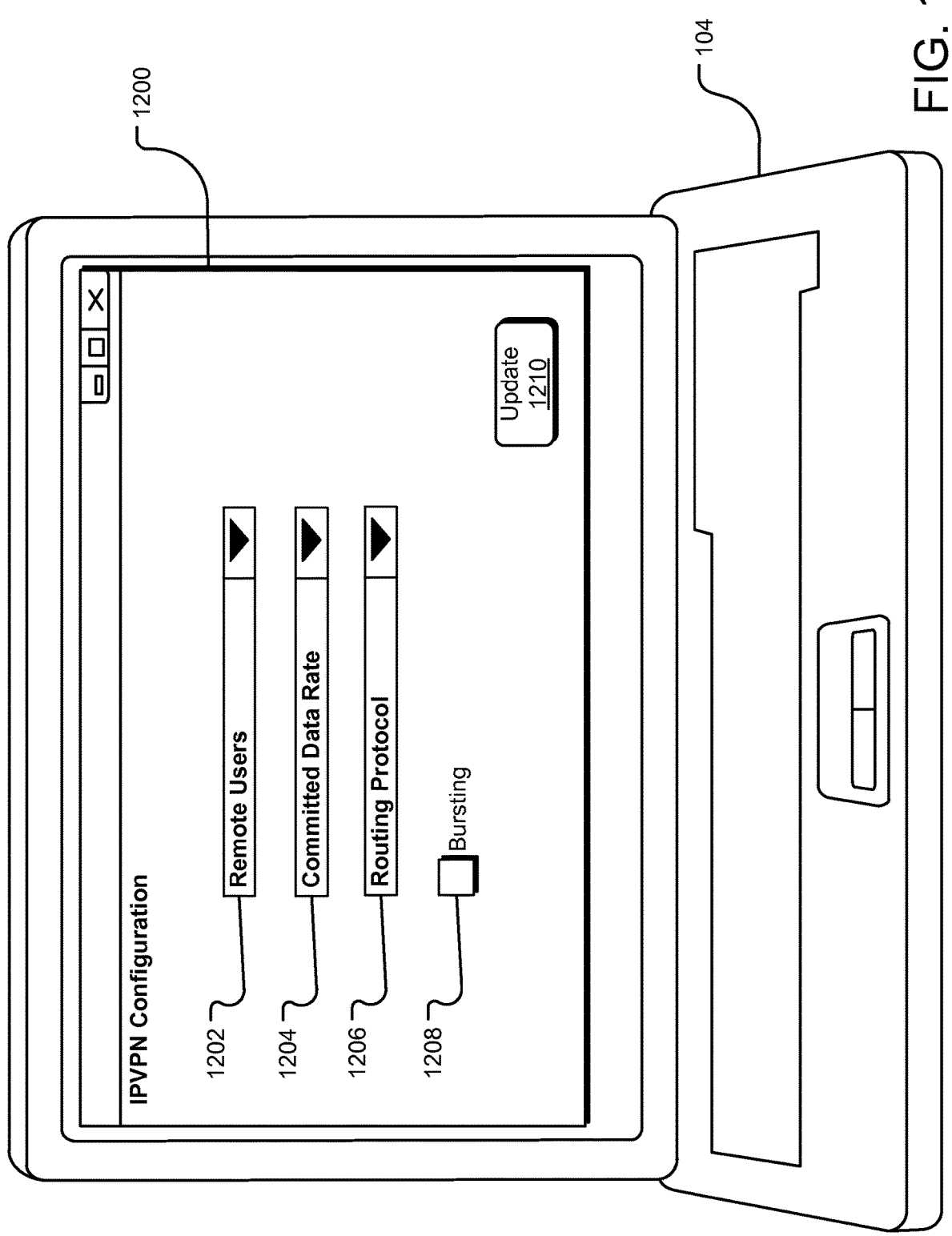
FIG. 12 illustrates another product configuration user interface for configuring an Internet Protocol (IP) Virtual Private Network (IPVPN) for one or more customer sites or groups.

FIG. 12 illustrates another product configuration user interface 1200 for configuring an IPVPN for one or more customer sites or groups. In one implementation, the design attributes for the IPVPN include, without limitation, a number of remote users 1202, a committed data range 1204, a routing protocol 1206, and a bursting option 1208. In one implementation, the diagram view of the design is automatically updated as data is input into the product configuration user interface 1200. In another implementation, an update button 1210 may be selected to update the design with the IPVPN configuration.

Figure 13:
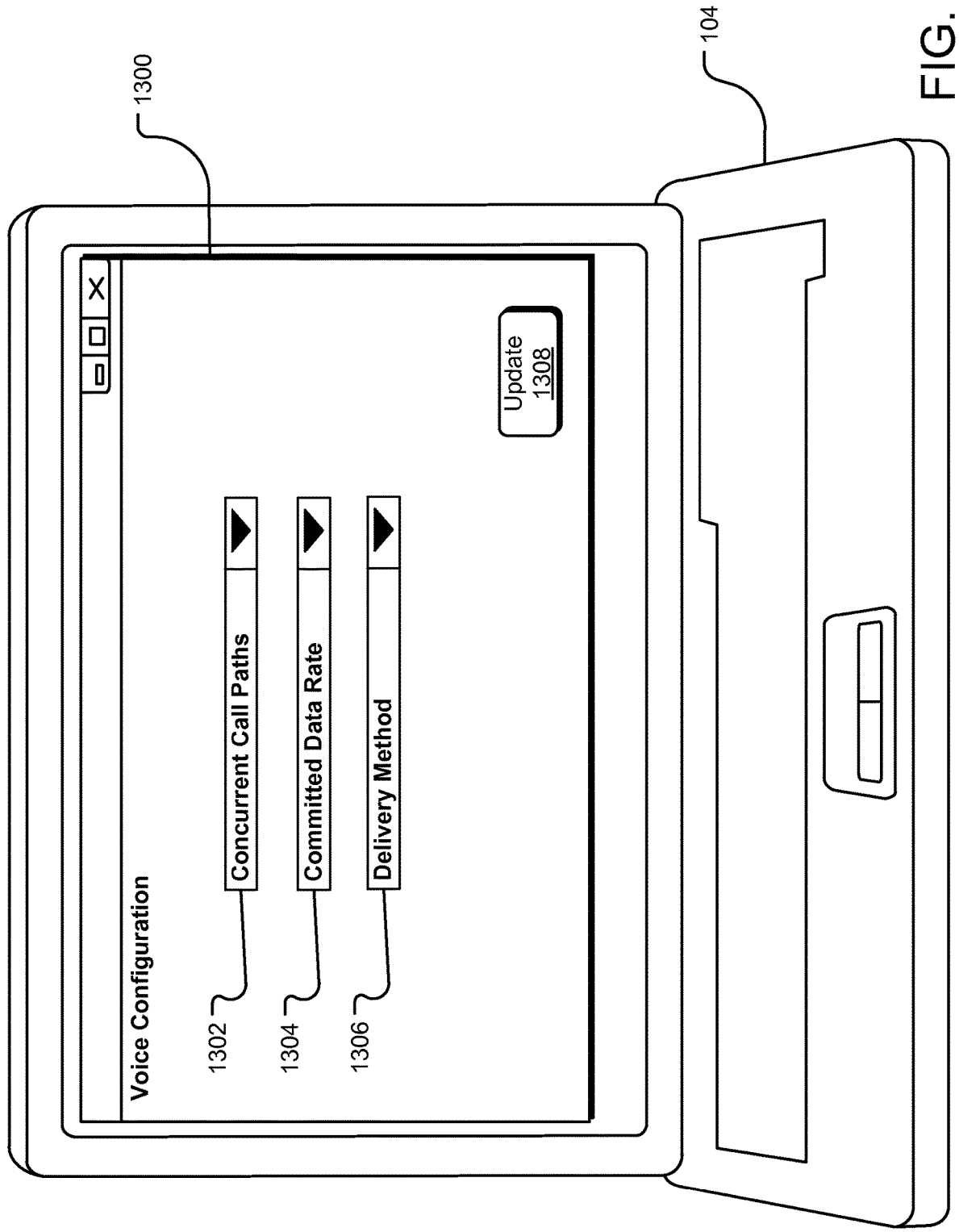
FIG. 13 shows another product configuration user interface for configuring voice services for one or more customer sites or groups.

Referring to FIG. 13, another product configuration user interface 1300 for configuring voice services for one or more customer sites or groups is shown. In one implementation, the design attributes for voice services include, without limitation, a number of concurrent call paths 1302, a committed data range 1304, and a delivery method 1306. In one implementation, the diagram view of the design is automatically updated as data is input into the product configuration user interface 1300. In another implementation, an update button 1308 may be selected to update the design with the voice configuration.

Figure 14:
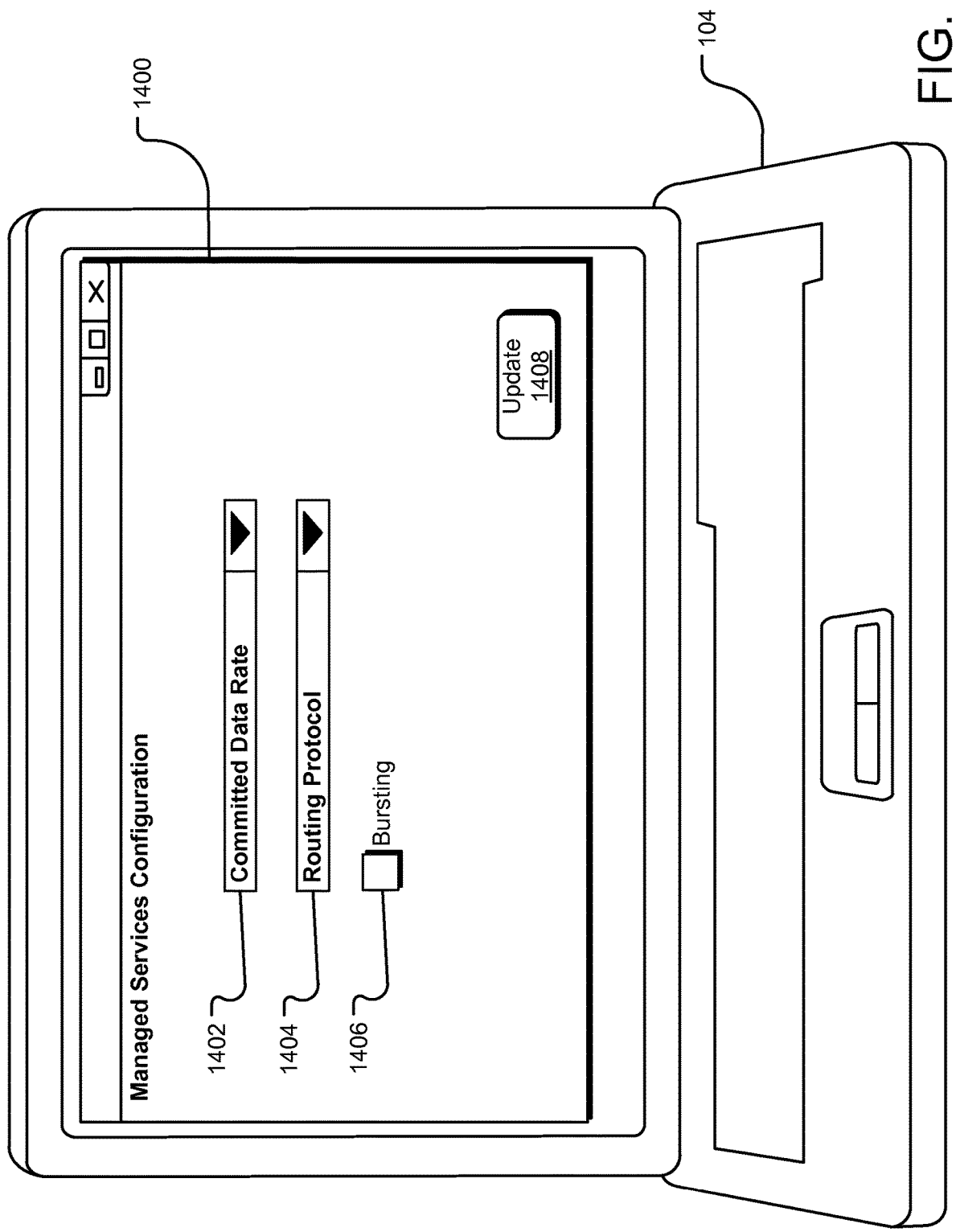
FIG. 14 shows another product configuration user interface for configuring managed services for one or more customer sites or groups.

As can be understood from FIG. 14, another product configuration user interface 1400 may be used for configuring managed services for one or more customer sites or groups. In one implementation, the design attributes for the managed services include, without limitation, a committed data range 1402, a routing protocol 1404, and a bursting option 1406. In one implementation, the diagram view of the design is automatically updated as data is input into the product configuration user interface 1400. In another implementation, an update button 1408 may be selected to update the design with the managed services configuration.

Figure 15:
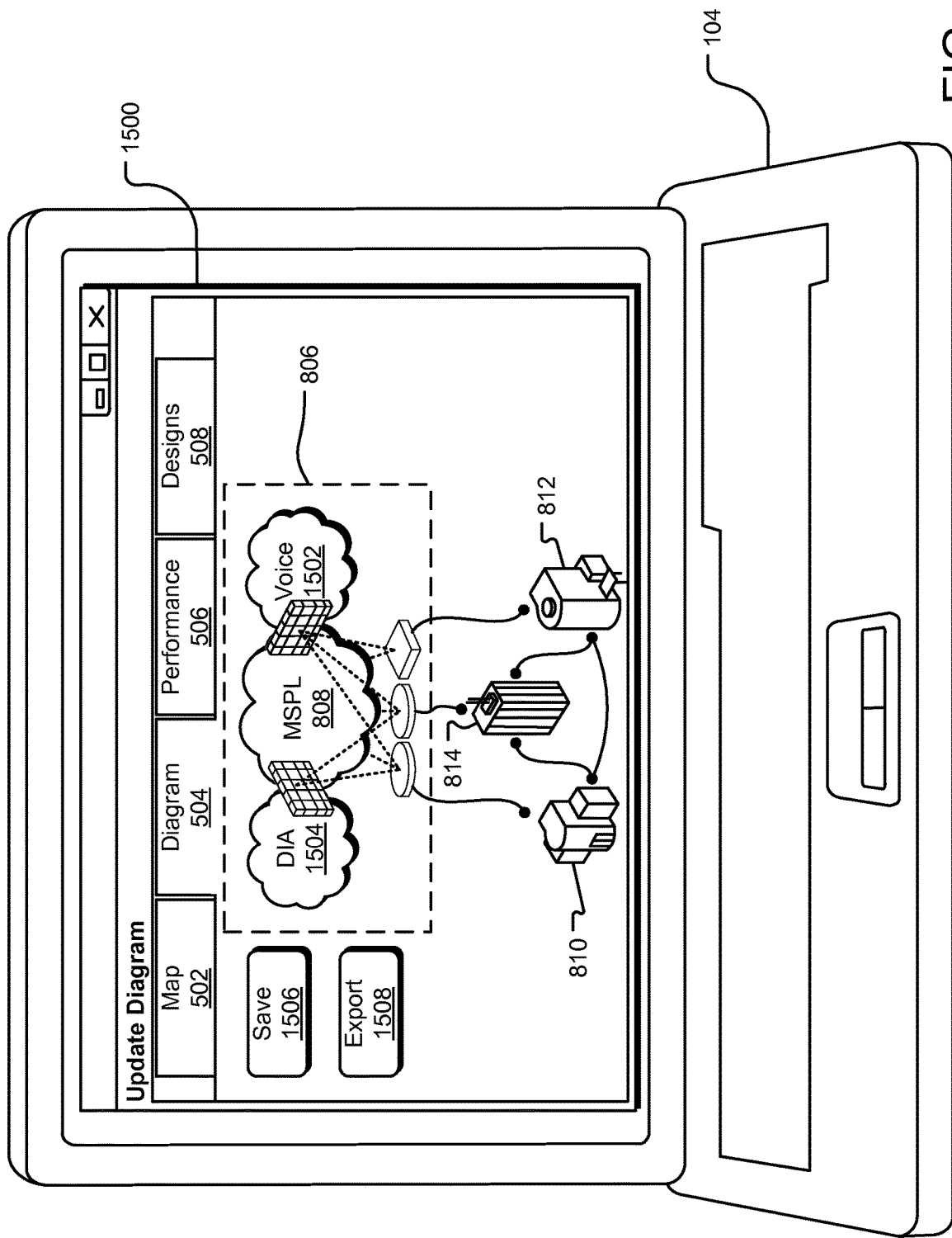
FIG. 15 illustrates a design user interface providing an updated diagram view of a customer solution.
Figure 16:
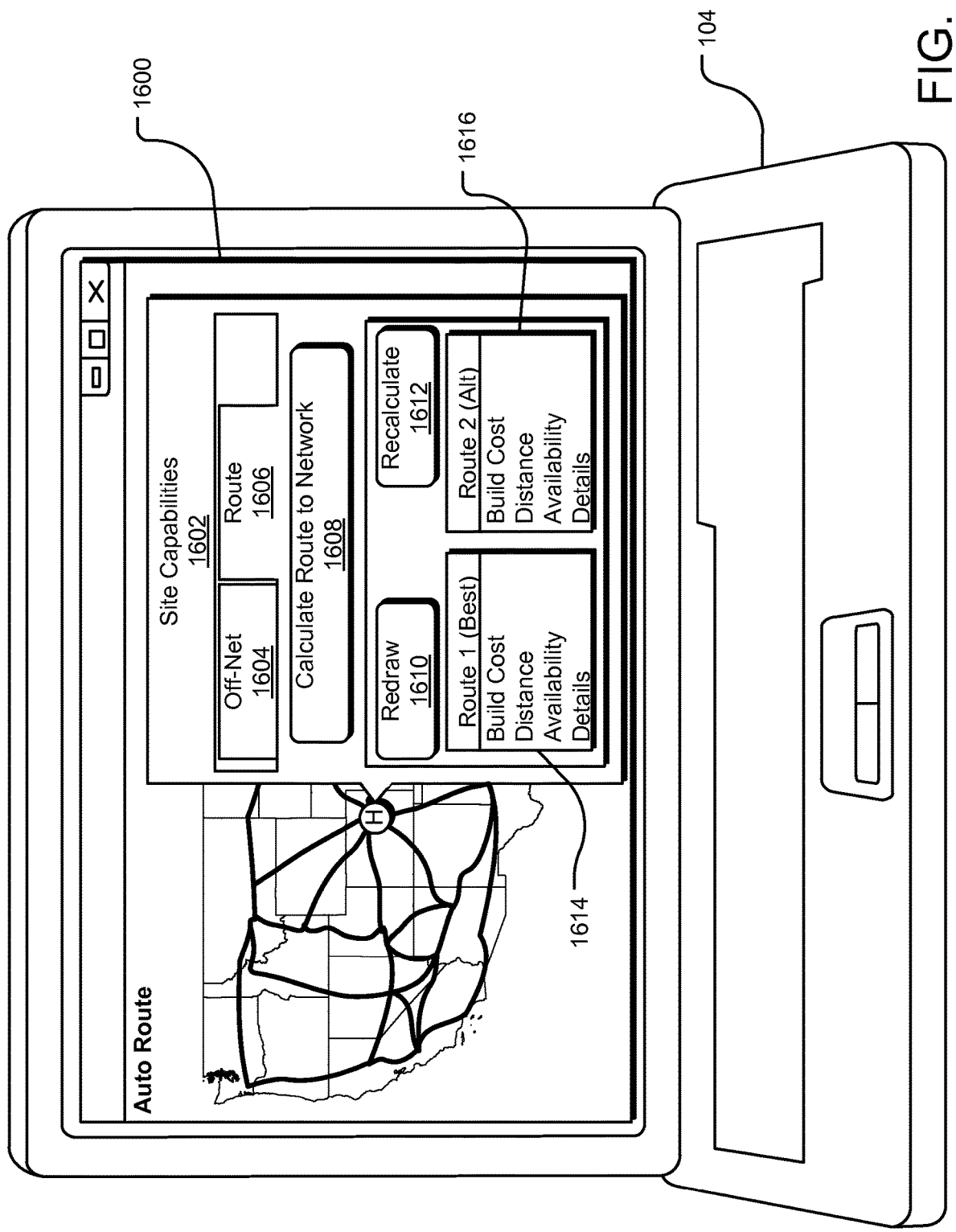
FIG. 16 depicts an autoroute user interface for generating routes from a customer site to access point(s) on the provider network.

As detailed herein, as input is received through any of the user interfaces 8-14, the design is automatically updated in real time and shown in the diagram view, for example, as can be understood from FIG. 15, which shows a design user interface 1500 providing an updated diagram view of a customer solution. In the example shown in FIG. 15, each of the groups 810-814 is configured for voice services 1502 and DIA 1504 with the multisite private line 808. A save button 1506 may be used to save the design, and an export button 1508 may be used to export the design, for example, for review and approval by the customer. In one implementation, the alignment of the various icons and the overall layout of the design is symmetrical with a radius of symmetry about a central point, such as the provider network 806, set automatically or manually depending on the number of customer sites and the products selected. Further, the lines connecting the various icons may be shown in different styles, such as a direct line style, a Manhattan line style, a spline line style, or a maze line style.

For a detailed description of an auto route user interface 1600 for generating routes from a customer site to access point(s) on the provider network, reference is made to FIG.

16. In one implementation, selection of a customer site from the map view (e.g., the map user interface 500) opens a site capabilities window 1602 providing information on off-net capabilities 1604 and route information 1606. To auto route a site to an access point on the provider network, a calculate route to network button 1608 is selected.

As described herein, the auto route may be calculated based on a number of factors, including, but not limited to build cost and distance, to determine one or more effective route options. The route options 1614-1616 and corresponding information are presented in the site capabilities window 1602 for review and selection. In one implementation, the route options 1614-1616 are presented according to their rank and include information, such as a build cost, a distance to the access point from the customer site, an availability of the route option, and any other relevant details, such as geographical features involved or impacted by the route option, and the like. If one of the route options 1614-1616 is financially and operationally viable, the option may be selected to configure the customer site. If not, the customer site may be treated as off-net or the route may be redrawn or recalculated using a redrawing button 1610 or a recalculating button 1612, respectively.

Figure 17:
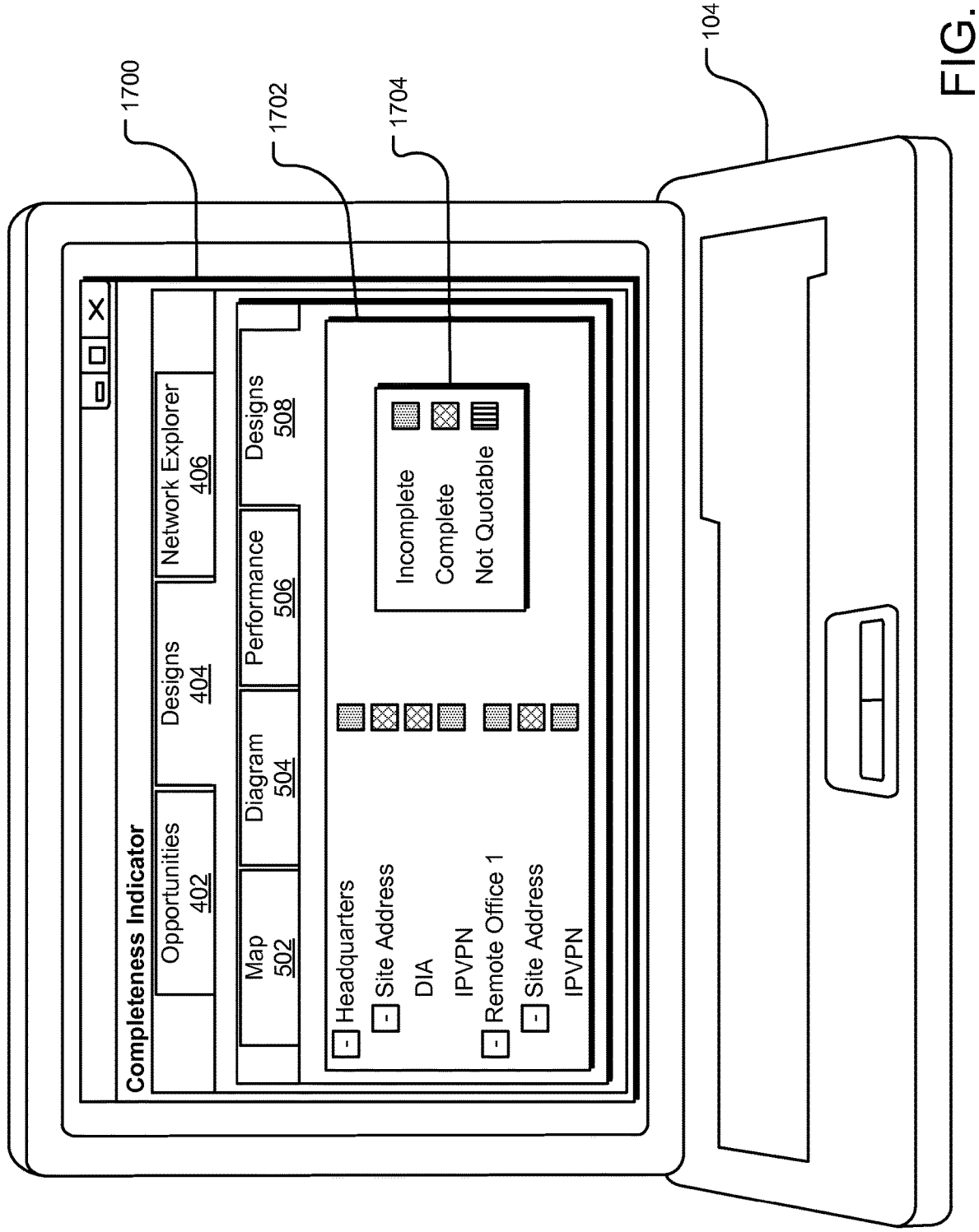
FIG. 17 shows a design user interface with a completeness indicator.

To facilitate completion of the design of the proposed customer solution, a design user interface 1700 with a completeness indicator 1702 may be used to assist a user in focus on incomplete items, as shown in FIG. 17. In one implementation, the completeness indicator 1702 includes a tree view of the groups, including each of the customer sites in the group and the products for each of the customer sites. Next to each level in the tree a visual cue is provided indicating a status of configuring the item. For example, the statuses 1704 may include, incomplete, complete, and not quotable. The visual cues may be, without limitation, colors, patterns, icons, or other visual alerts or indicators.

Figure 18:
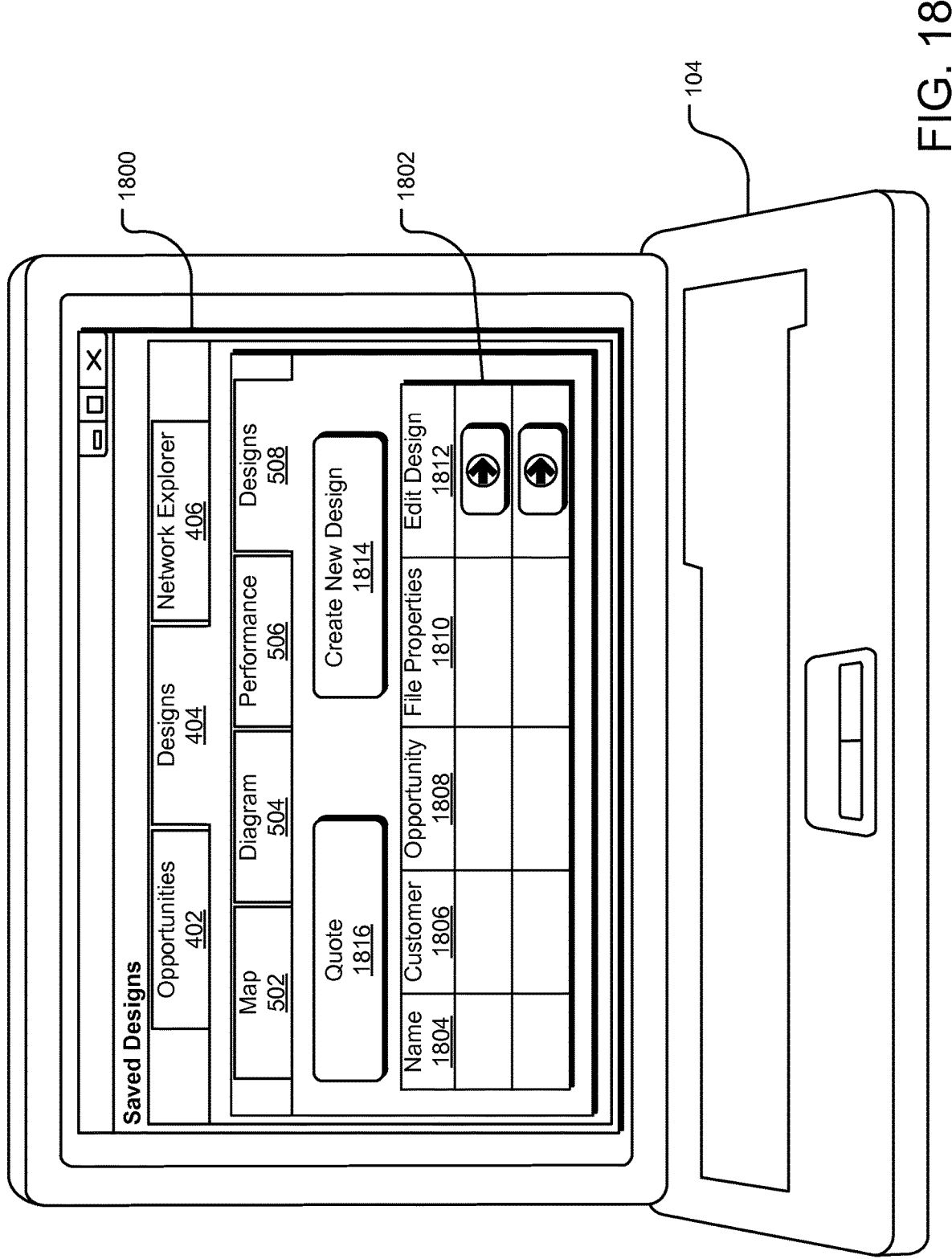
FIG. 18 illustrates a saved designs user interface depicting saved designs, including multiple design versions.

In one implementation, a saved designs user interface 1800 includes saved designs, including multiple design versions, as shown in FIG. 18. In one implementation, information regarding saved designs is detailed in a table 1802. The information may include, a design identifier 1804, a customer identifier 1806, an opportunity identifier 1808, and file properties 1810, and the like. In one implementation, the file properties 1810 includes a creator, a creation date, a last modified date, a design version, and/or details differentiating the design versions. The table 1802 may also include an edit design link 1812 for editing each of the saved designs. A create new design button 1814 may be used to create a new design. In some implementations, a quote button 1816 may be used to generate a quote or pull attributes from a quoting tool for one or more of the designs.

Figure 19:
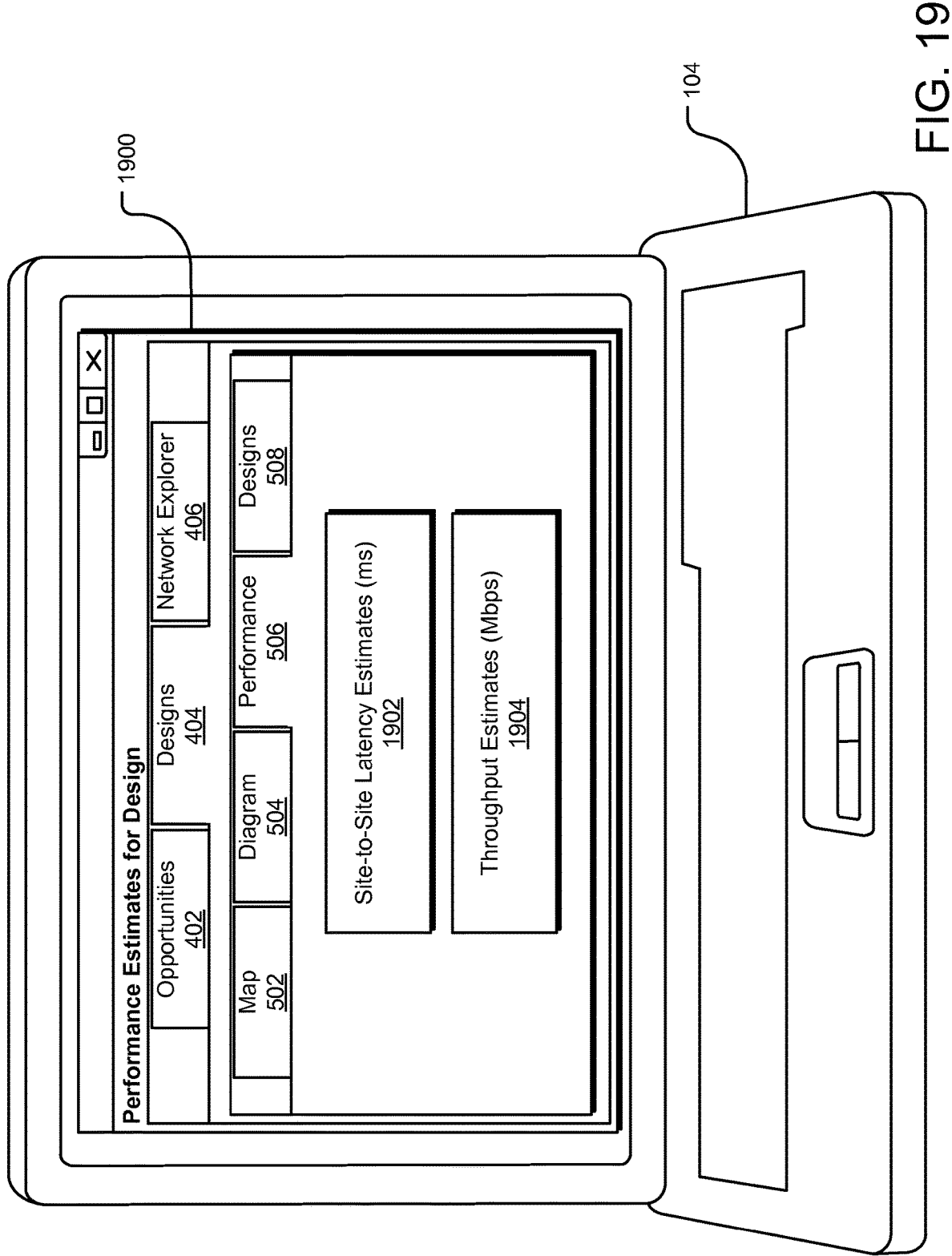
FIG. 19 shows a performance user interface providing performance estimates for a design.

To determine a viability of a design, a performance user interface 1900 providing performance estimates for a design may be used, as shown in FIG. 19. In one implementation, the performance estimates includes site-to-site latency estimate 1902 in milliseconds and throughput estimates 1904 in megabits per second. The site-to-site latency estimate 1902 may be shown, for example, in table format with each site listed across a top row and a side column of the table. The latency between each of the sites in listed in the table. In one implementation, the table may include color coding reflecting the estimated latency. For example, one color may represent an estimated latency of less than 30 milliseconds, a second color may represent an estimated latency between 30 milliseconds and 100 milliseconds, and a third color may represent an estimated latency of over 100 milliseconds. In one implementation, the throughput estimates 1904 for each of the sites may include a default throughput estimate and an optimal throughput estimate.

For a detailed description of example customer service analytics user interfaces, reference is made to FIGS. 20-23. In one implementation, to navigate to the customer service analytics for an existing customer network, the network explorer tab 406 is used. As can be understood from FIGS. 20-23, in one implementation, the sales engineering tool 102 generates the customer service analytics user interfaces with tabs 2002-2008 to navigate between a customer footprint 2002, a performance report 2004, a security report 2006, and suggestions 2008, respectively, for a customer selected, for example, using drop down menu 2010. It will be appreciated that more or fewer tabs may be provided for navigating to and from different customer service analytics.

Figure 20:
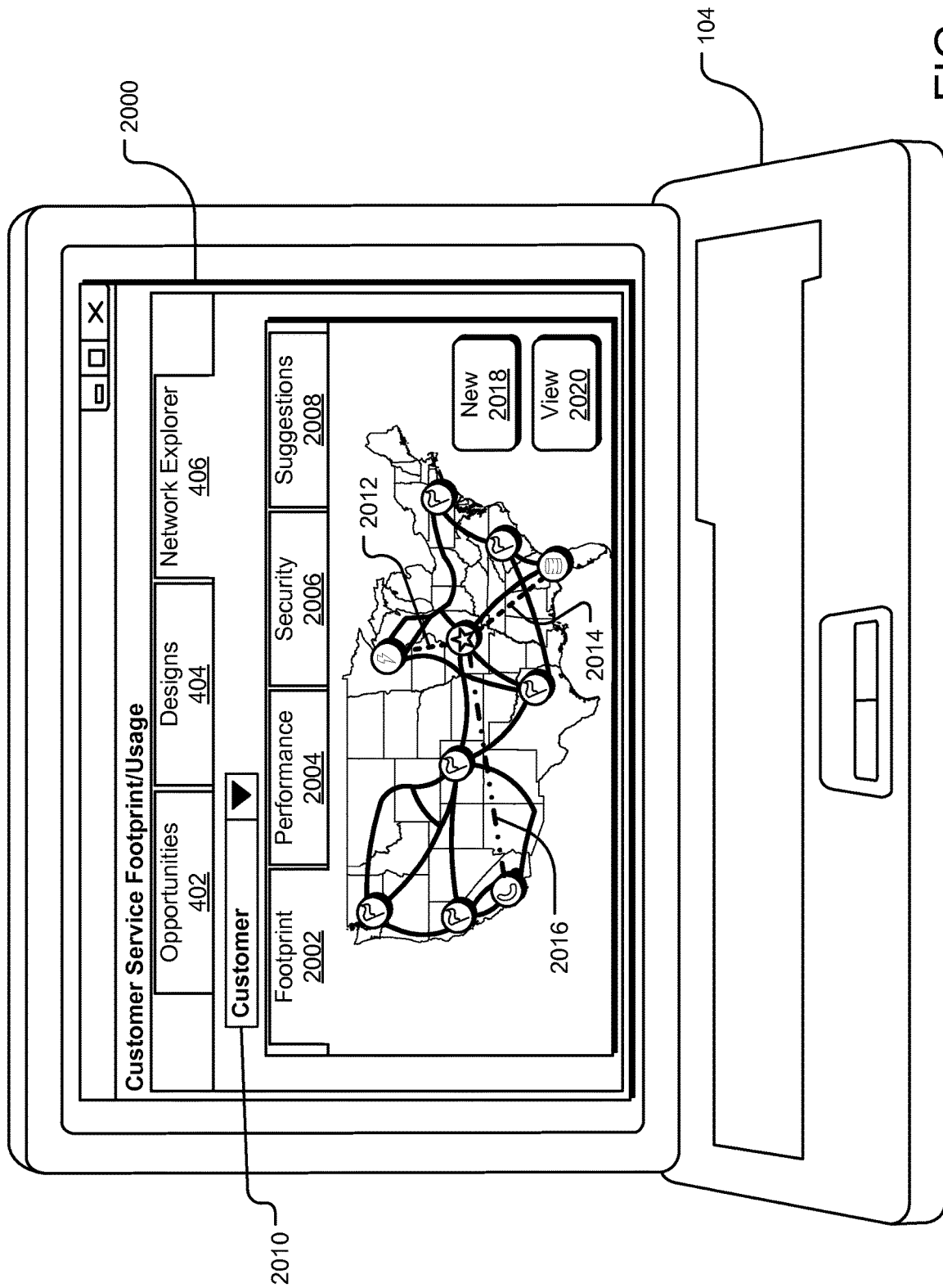
FIG. 20 illustrates a customer service user interface showing a map view of a customer's usage and inventory.

In one implementation, the footprint tab 2002 provides an integrated map view of a customer's usage and inventory on a customer service user interface 2000, as shown in FIG. 20. In one implementation, a capacity of connections 2012-2016 between customer sites is shown in the footprint, along with suggestions for improving capacity. For example, the connections 2012 and 2014 may be each be 300 Mbps with no suggestions provided, while the connection 2016 may be 100 Mbps and include an alert that capacity is maxed with an upgrade suggestion. A new button 2018 may be used to create a new design for a customer solution, for example, to address the capacity issue of the connection 2016, and a view button 2020 may be used to view all designs for the selected customer 2010.

Figure 21:
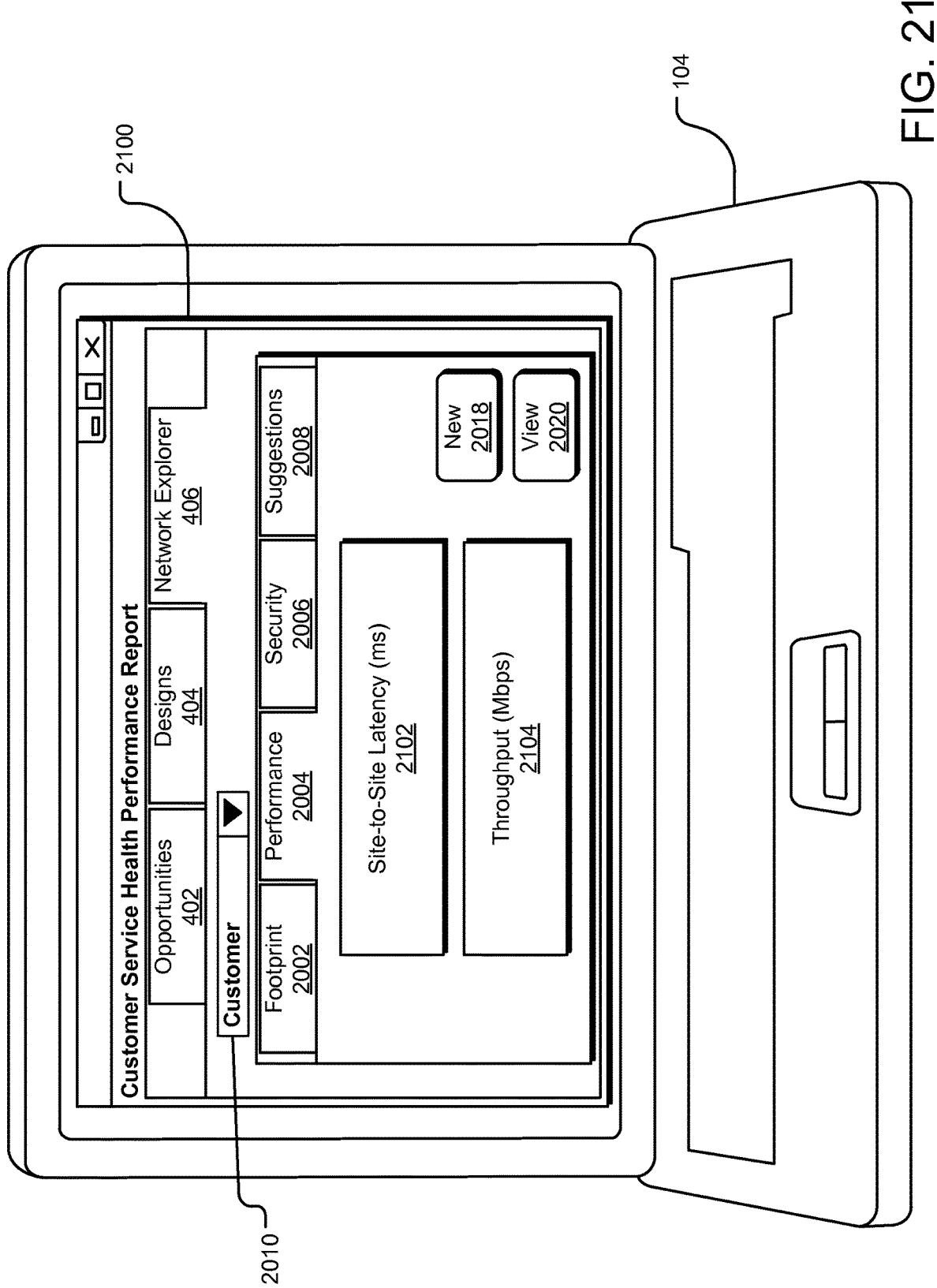
FIG. 21 shows another customer service user interface providing a health performance report for a customer.

FIG. 21 shows another customer service user interface 2100 providing a health performance report for the selected customer 2010. In one implementation, the performance report includes actual site-to-site latency 2102 in milliseconds and actual throughput 2104 in megabits per second. The actual site-to-site latency 2102 may be shown, for example, in table format with each site listed across a top row and a side column of the table. The latency between each of the sites in listed in the table. In one implementation, the table may include color coding reflecting the actual latency. For example, one color may represent an estimated latency of less than 30 milliseconds, a second color may represent an estimated latency between 30 milliseconds and 100 milliseconds, and a third color may represent an estimated latency of over 100 milliseconds. In one implementation, the actual throughput 2104 for each of the sites may include a default throughput and an optimal throughput.

Figure 22:
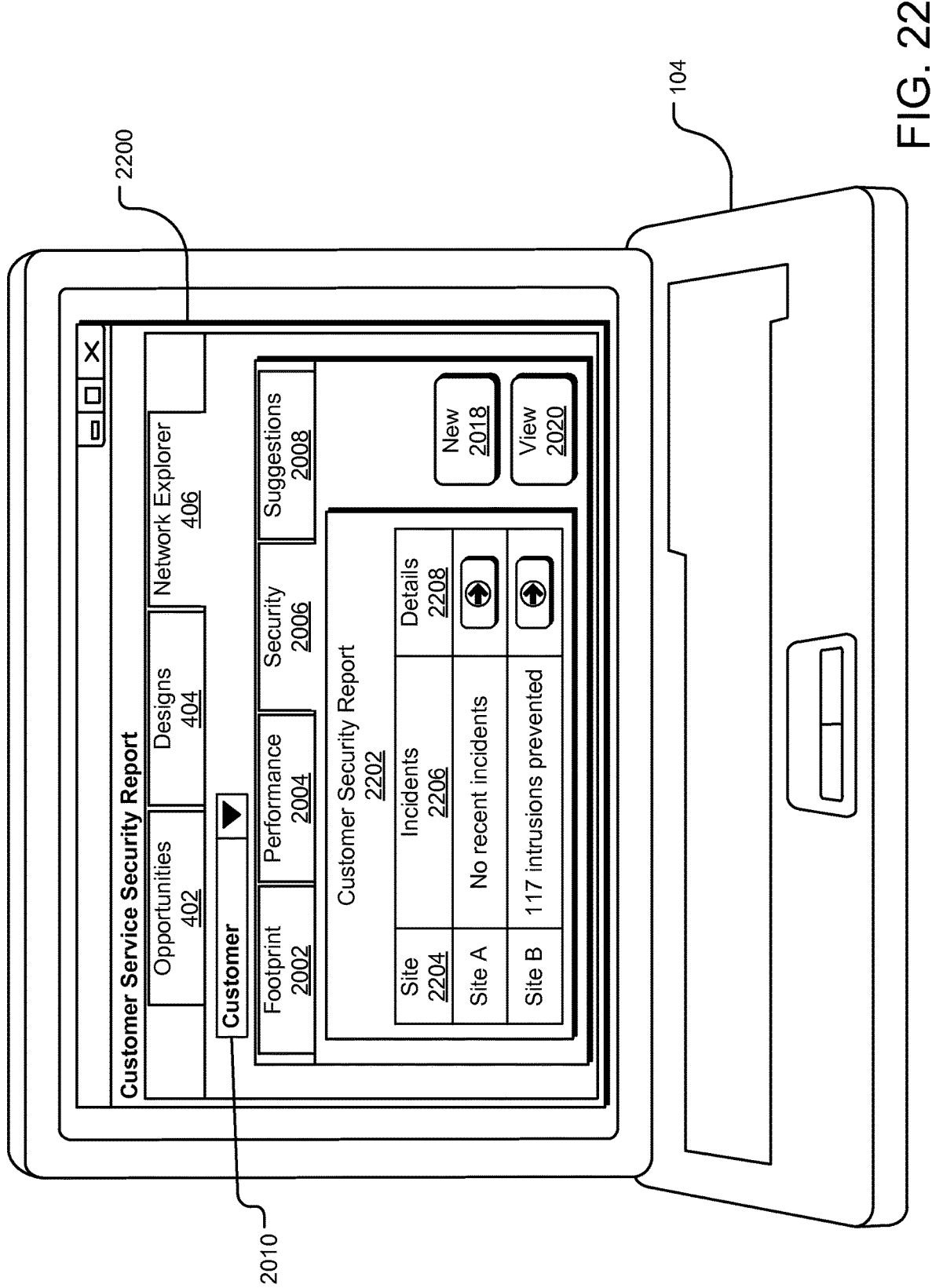
FIG. 22 shows another customer service user interface detailing security incidents for a customer.

Referring to FIG. 22, another customer service user interface 2200 displaying a security report 2202 detailing security incidents for the selected customer 2010 is shown. In one implementation, the security report 2202 includes a table listing each of the sites 2204 of the selected customer 2010 and incidents 2206 for each of the sites 2204. For example, as shown in FIG. 22, Site A may have no recent incidents, and the provider network may be prevented 117 attempted intrusions at Site B. To view details about the incidents 2206, a link 2208 to the details is provided.

Figure 23:
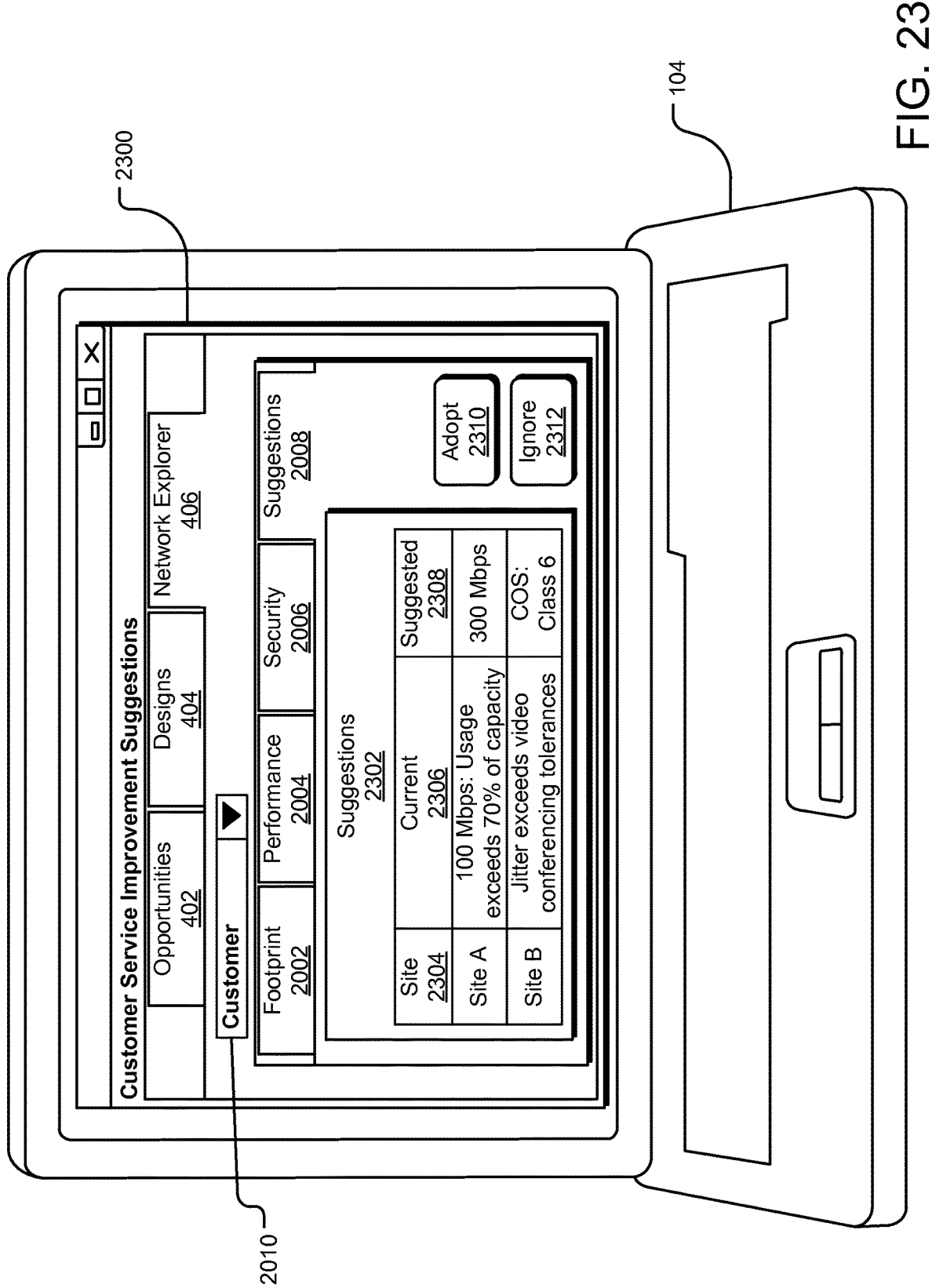
FIG. 23 shows another customer service user interface providing improvement suggestions for optimizing performance for a customer.

FIG. 23 shows another customer service user interface 2300 providing improvement suggestions 2302 for optimizing performance for the selected customer 2010. In one implementation, the suggestions 2303 are detailed in a table listing a customer site 2304, current configuration details 2306 for the site 2304, and suggested configuration details 2308 for the site 2304. The customer service user interface 2300 may include an adopt button 2310 for generating a design for a customer solution adopting one or more of the suggestions and an ignore button 2312 for ignoring one or more of the suggestions. In one implementation, selecting the adopt button 2310 causes an SDN front end tool may be used to make changes to the physical network using an API. Stated differently, the customer service user interface 2300 may be used to build customer solutions for existing customers by changing logical descriptions rather than by building physical hardware, thereby immediately implementing one or more of the suggestions 2302.

Figure 24:
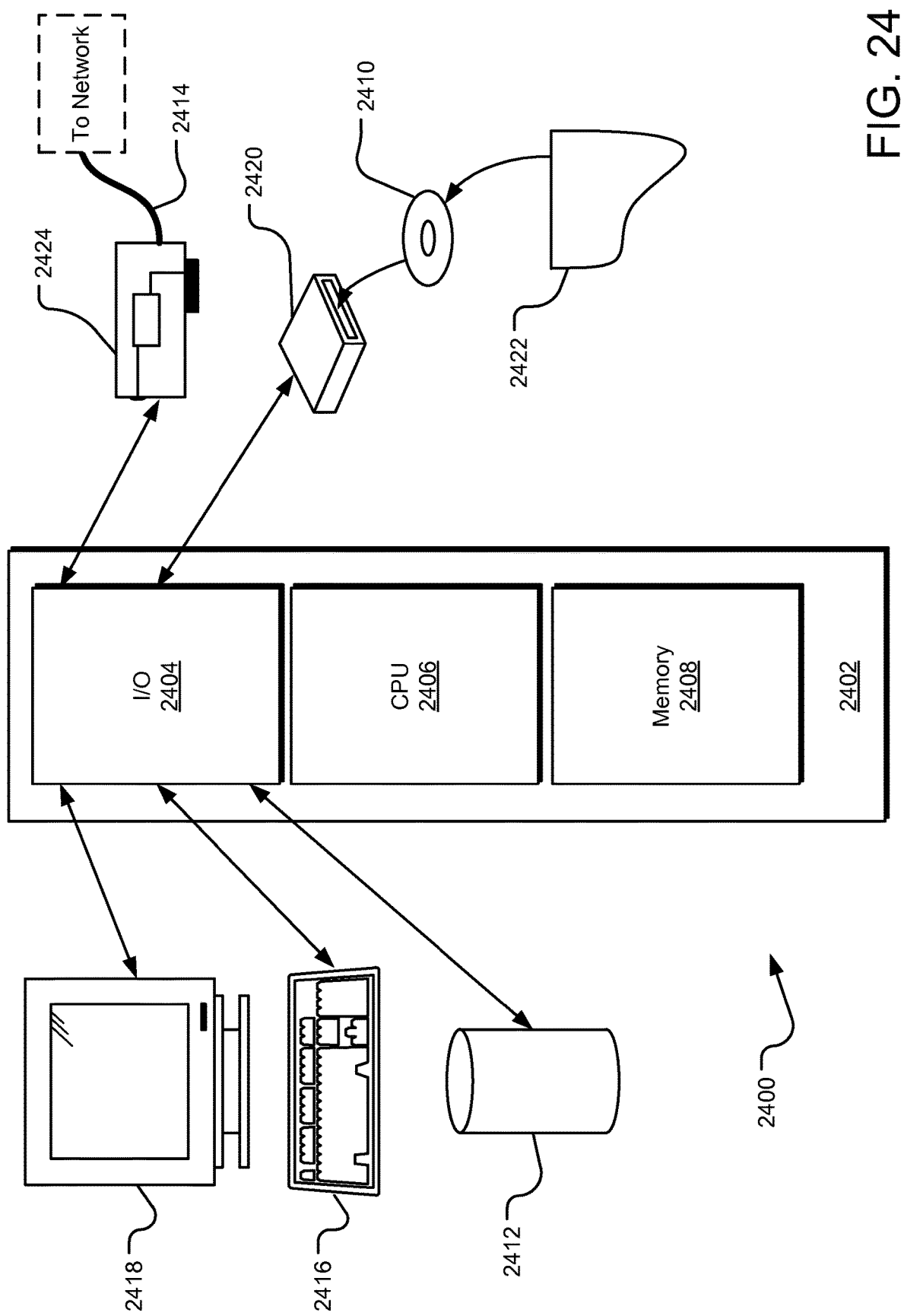
FIG. 24 is an example computing system that may be specifically configured to implement the various systems and methods discussed herein.

Referring to FIG. 24, a detailed description of an example computing system 2400 having one or more computing devices that may implement various systems and methods discussed herein is provided. The computing system 2400 may be applicable to the user device 104, the server, or other computing devices. It will be appreciated that specific implementations of these devices may be of differing possible specific computing architectures not all of which are specifically discussed herein but will be understood by those of ordinary skill in the art.

The computer system 2400 may be a general computing system is capable of executing a computer program product to execute a computer process. Data and program files may be input to the computer system 2400, which reads the files and executes the programs therein. Some of the elements of a general purpose computer system 2400 are shown in FIG. 24 wherein a processor 2402 is shown having an input/output (I/O) section 2404, a Central Processing Unit (CPU) 2406, and a memory section 2408. There may be one or more processors 2402, such that the processor 2402 of the computer system 2400 comprises a single central-processing unit 2406, or a plurality of processing units, commonly referred to as a parallel processing environment. The computer system 2400 may be a conventional computer, a distributed computer, or any other type of computer, such as one or more external computers made available via a cloud computing architecture. The presently described technology is optionally implemented in software devices loaded in memory 2408, stored on a configured DVD/CD-ROM 2410 or storage unit 2412, and/or communicated via a wired or wireless network link 2414, thereby transforming the computer system 2400 in FIG. 24 to a special purpose machine for implementing the described operations.

The I/O section 2404 is connected to one or more user-interface devices (e.g., a keyboard 2416 and a display unit 2418), a disc storage unit 2412, and a disc drive unit 2420. In the case of a tablet or smart phone device, there may not be a physical keyboard but rather a touch screen with a computer generated touch screen keyboard. Generally, the disc drive unit 2420 is a DVD/CD-ROM drive unit capable of reading the DVD/CD-ROM medium 2410, which typically contains programs and data 2422. Computer program products containing mechanisms to effectuate the systems and methods in accordance with the presently described technology may reside in the memory section 2404, on a disc storage unit 2412, on the DVD/CD-ROM medium 2410 of the computer system 2400, or on external storage devices made available via a cloud computing architecture with such computer program products, including one or more database management products, web server products, application server products, and/or other additional software components. Alternatively, a disc drive unit 2420 may be replaced or supplemented by an optical drive unit, a flash drive unit, magnetic drive unit, or other storage medium drive unit. Similarly, the disc drive unit 2420 may be replaced or supplemented with random access memory (RAM), magnetic memory, optical memory, and/or various other possible forms of semiconductor based memories commonly found in smart phones and tablets.

The network adapter 2424 is capable of connecting the computer system 2400 to a network via the network link 2414, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 2400 is connected (by wired connection or wirelessly) to a local network through the network interface or adapter 2424, which is one type of communications device. When used in a WAN-networking environment, the computer system 2400 typically includes a modem, a network adapter, or any other type of communications device for establishing communications over the wide area network. In a networked environment, program modules depicted relative to the computer system 2400 or portions thereof, may be stored in a remote memory storage device. It is appreciated that the network connections shown are examples of communications devices for and other means of establishing a communications link between the computers may be used.

In an example implementation, the sales engineering tool 102, sales opportunities, designs, customer service analytics, a plurality of internal and external databases, source databases, and/or cached data on servers are stored as the memory 2408 or other storage systems, such as the disk storage unit 2412 or the DVD/CD-ROM medium 2410, and/or other external storage devices made available and accessible via a network architecture. Network outage tracker software and other modules and services may be embodied by instructions stored on such storage systems and executed by the processor 2402.

Some or all of the operations described herein may be performed by the processor 2402. Further, local computing systems, remote data sources and/or services, and other associated logic represent firmware, hardware, and/or software configured to control operations of the sales engineering tool 102, the user devices 104, and/or other computing devices or components of the network environment 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 2402 and a user may interact with a GUI using one or more user-interface devices (e.g., the keyboard 2416, the display unit 2418, and the user devices 104) with some of the data in use directly coming from online sources and data stores. The system set forth in FIG. 24 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for improving a network, the method comprising:
   retrieving technical infrastructure information for an installed network design, for a plurality of physical network hardware components, providing one or more telecommunication products at one or more customer sites;
   generating customer service analytics based on the technical infrastructure information using at least one computing device, wherein generating customer service analytics comprises:
      analyzing performance of the installed network design; and
      determining a first improvement suggestion for the installed network design based on the performance of the installed network design;
   outputting, for display, a graphical user interface having a plurality of selectable tabs, including a performance tab and a suggestions tab;
   receiving a selection of the performance tab;
   in response to receiving the selection of the performance tab, outputting, for display in the graphical user interface, data for the performance of the installed network design;
   receiving a selection of the suggestions tab;
   in response to receiving the selection of the suggestions tab, outputting, for display in the graphical user interface, a user interface element for the first improvement suggestion;
   receiving a selection of the user interface element through the graphical user interface; and
   upon receiving the selection of the user interface element, changing, by a software defined networks (SDN) tool, the installed network design to implement the first improvement suggestion in an improved network design.

2. The method of claim 1, wherein the customer service analytics include a customer footprint representing network usage and capacity.

3. The method of claim 1, wherein the installed network design provides one or more telecommunication products at a plurality of customer sites and the customer service analytics include attributions for a circuit from site to site.

4. The method of claim 1, wherein the customer service analytics include an actual performance of the one or more telecommunication products.

5. The method of claim 4, wherein the installed network design provides one or more telecommunication products at a plurality of customer sites and the actual performance incudes a measured site to site latency.

6. The method of claim 4, wherein the actual performance incudes a measured throughput.

7. The method of claim 1, wherein the customer service analytics include a security report detailing security incidents for the one or more customer sites.

8. The method of claim 1, wherein the improvement suggestion is a capacity increase, a diversity increase, or a security improvement.

9. The method of claim 1, wherein changing the installed network design includes changing a class of service.

10. The method of claim 1, wherein changing the installed network design includes changing a bandwidth capacity.

11. The method of claim 1, wherein changing the installed network design includes changing logical descriptions rather than building physical hardware, thereby immediately implementing the first improvement suggestion.

12. The method of claim 1, further comprising:
   based on the performance of the improved network design, determining a second improvement suggestion for the installed network design; and
   outputting the second improvement suggestion for display.

13. One or more non-transitory tangible computer-readable storage media storing computer-executable instructions for performing a computer process on a computing system, the computer process comprising:
   retrieving technical infrastructure information for an installed network design providing one or more telecommunication products at one or more customer sites;
   generating customer service analytics based on the technical infrastructure information using at least one computing device, wherein generating customer service analytics comprises:
      analyzing performance of the installed network design;
      determining a first improvement suggestion for the installed network design based on the performance of the installed network design, wherein the first improvement suggestion is a capacity increase, a diversity increase, or a security improvement;

outputting, for display, a graphical user interface having a plurality of selectable tabs, including a performance tab and a suggestions tab;

receiving a selection of the performance tab;

in response to receiving the selection of the performance tab, outputting, for display in the graphical user interface, data for the performance of the installed network design;

receiving a selection of the suggestions tab;

in response to receiving the selection of the suggestions tab, outputting, for display in the graphical user interface, a selectable user interface element for the first improvement suggestion;

receiving selection of the selectable user interface element through the graphical user interface; and upon receiving the selection of the user interface element, changing, by a software defined networks (SDN) tool, the installed network design to implement the first improvement suggestion in an improved network design.

14. The one or more non-transitory tangible computer-readable storage media of claim 13, wherein the installed network design provides one or more telecommunication products at a plurality of customer sites and the customer service analytics include attributions for a circuit from site to site.

15. The one or more non-transitory tangible computer-readable storage media of claim 13, wherein the customer service analytics include an actual performance of the one or more telecommunication products.

16. The one or more non-transitory tangible computer-readable storage media of claim 15, wherein the installed network design provides one or more telecommunication products at a plurality of customer sites and the actual performance incudes a measured site to site latency.

17. The one or more non-transitory tangible computer-readable storage media of claim 15, wherein the actual performance incudes a measured throughput.

18. The one or more non-transitory tangible computer-readable storage media of claim 13, wherein the customer service analytics include a security report detailing security incidents for the one or more customer sites.

19. A system for improving a network, the system comprising:

one or more databases storing technical infrastructure information for an installed network design providing one or more telecommunication products at customer sites; and at least one server in communication with the one or more databases, the at least one server configured to:

based on technical infrastructure information, analyze performance of the installed network design;

based on the performance of the installed network design, determine a first improvement suggestion for a first customer site at a first location and a second improvement suggestion for a second customer site at a second location;

output, for display on a graphical user interface, the first improvement suggestion and the second improvement suggestion;

generate, for display on the graphical user interface, a selectable user interface element to adopt at least one of the first improvement suggestion or the second improvement suggestion;

receive a selection of a user interface element through the graphical user interface; and upon receiving the selection of the user interface element, change the installed network design to implement the first improvement suggestion.

20. The system of claim 19, wherein the customer service analytics include attributions for a circuit from the first customer site to the second customer site.

21. The system of claim 19, wherein the performance incudes a measured site to site latency, wherein the site to site latency is a latency between the first customer site and the second customer site.

22. The system of claim 19, wherein the performance incudes a measured throughput.

23. The system of claim 19, wherein the first improvement suggestion is a capacity increase, a diversity increase, or a security improvement.

24. The system of claim 19, wherein the at least one server is further configured to:

output, for display, a graphical user interface having a plurality of selectable tabs, including a footprint tab, a performance tab, and a suggestions tab;

receive a selection of the footprint tab;

in response to receiving a selection of the footprint tab, displaying a map with display of the first customer site at the first location and the second customer site at the second location;

receive a selection of the performance tab; and in response to receiving the selection of the performance tab, output, for display in the graphical user interface, data for the performance of the installed network design, including latency from the first customer site to the second customer site.

* * * * *